US009291173B2

(12) United States Patent
Ishikawa et al.

(10) Patent No.: US 9,291,173 B2
(45) Date of Patent: Mar. 22, 2016

(54) HYDRAULIC HYBRID VEHICLE

(71) Applicant: HONDA MOTOR CO., LTD., Tokyo (JP)

(72) Inventors: Seiichiro Ishikawa, Wako (JP); Yasunari Kimura, Wako (JP); Masashi Kato, Wako (JP); Daiki Sato, Wako (JP); Yuki Shibahata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 495 days.

(21) Appl. No.: 13/787,050

(22) Filed: Mar. 6, 2013

(65) Prior Publication Data
US 2013/0239559 A1 Sep. 19, 2013

(30) Foreign Application Priority Data

Mar. 14, 2012 (JP) ................................ 2012-056805
Mar. 14, 2012 (JP) ................................ 2012-056807
Mar. 14, 2012 (JP) ................................ 2012-056808

(51) Int. Cl.
*F15B 1/02* (2006.01)
*F15B 1/04* (2006.01)
*B60K 6/12* (2006.01)

(52) U.S. Cl.
CPC ... *F15B 1/04* (2013.01); *B60K 6/12* (2013.01); *F15B 1/024* (2013.01); *Y02T 10/6208* (2013.01)

(58) Field of Classification Search
CPC ................................................ B60K 2006/126
See application file for complete search history.

(56) References Cited

U.S. PATENT DOCUMENTS 3,937,129 A * 2/1976 Miller .................... F15B 11/165
                                                      137/115.06
5,129,229 A * 7/1992 Nakamura ............ F15B 11/165
                                                      137/596.13
7,401,465 B2 * 7/2008 Emmert .................. F15B 11/17
                                                      60/430
2006/0079375 A1 * 4/2006 Marshall .................. B60K 6/12
                                                      477/115

FOREIGN PATENT DOCUMENTS

JP   H01-307574   12/1989
JP   H04-337168   11/1992
JP   H06107139    4/1994
(Continued)

OTHER PUBLICATIONS

JP Office Communication dated Jul. 22, 2015, 2 pages.
(Continued)

*Primary Examiner* — F. Daniel Lopez
(74) *Attorney, Agent, or Firm* — Rankin, Hill & Clark LLP

(57) ABSTRACT

A pump motor of a hydraulic hybrid system also serves as a pump to supply hydraulic oil or lubricating oil to a power train, thus enabling elimination of an oil pump provided in the power train and hence reductions in the number of parts and cost, and, in addition, an existing oil pan provided in the power train and the like are utilized for the hydraulic hybrid system, which in turn enables achieving further reductions in the number of parts and cost. Moreover, when idle-reduction control is performed on an engine, during engine's stopped conditions, the pump motor can be driven as a motor by hydraulic pressure accumulated in an accumulator to start the engine and supply the hydraulic pressure to a transmission, thus eliminating a need to provide a motor-driven oil pump for the idle-reduction control and hence enabling a further reduction in cost.

7 Claims, 24 Drawing Sheets

(56) References Cited

FOREIGN PATENT DOCUMENTS

| | | |
|---|---|---|
| JP | H08282324 | 10/1996 |
| JP | 2003-287147 | 10/2003 |
| JP | 2004-084879 | 3/2004 |
| JP | 2005205928 | 8/2005 |
| JP | 2006-132565 | 5/2006 |
| JP | 2007524540 | 8/2007 |
| JP | 2007-309459 | 11/2007 |
| JP | 2010138803 | 6/2010 |
| JP | 2011-256987 | 12/2011 |
| JP | 2012042040 | 3/2012 |

OTHER PUBLICATIONS

Japanese Official Communication from corresponding application JP 2012-056805 dated Sep. 2, 2015, 2 pages.

Japanese Official Communication from corresponding application JP 2012-056808 dated Sep. 9, 2015, 3 pages.

\* cited by examiner

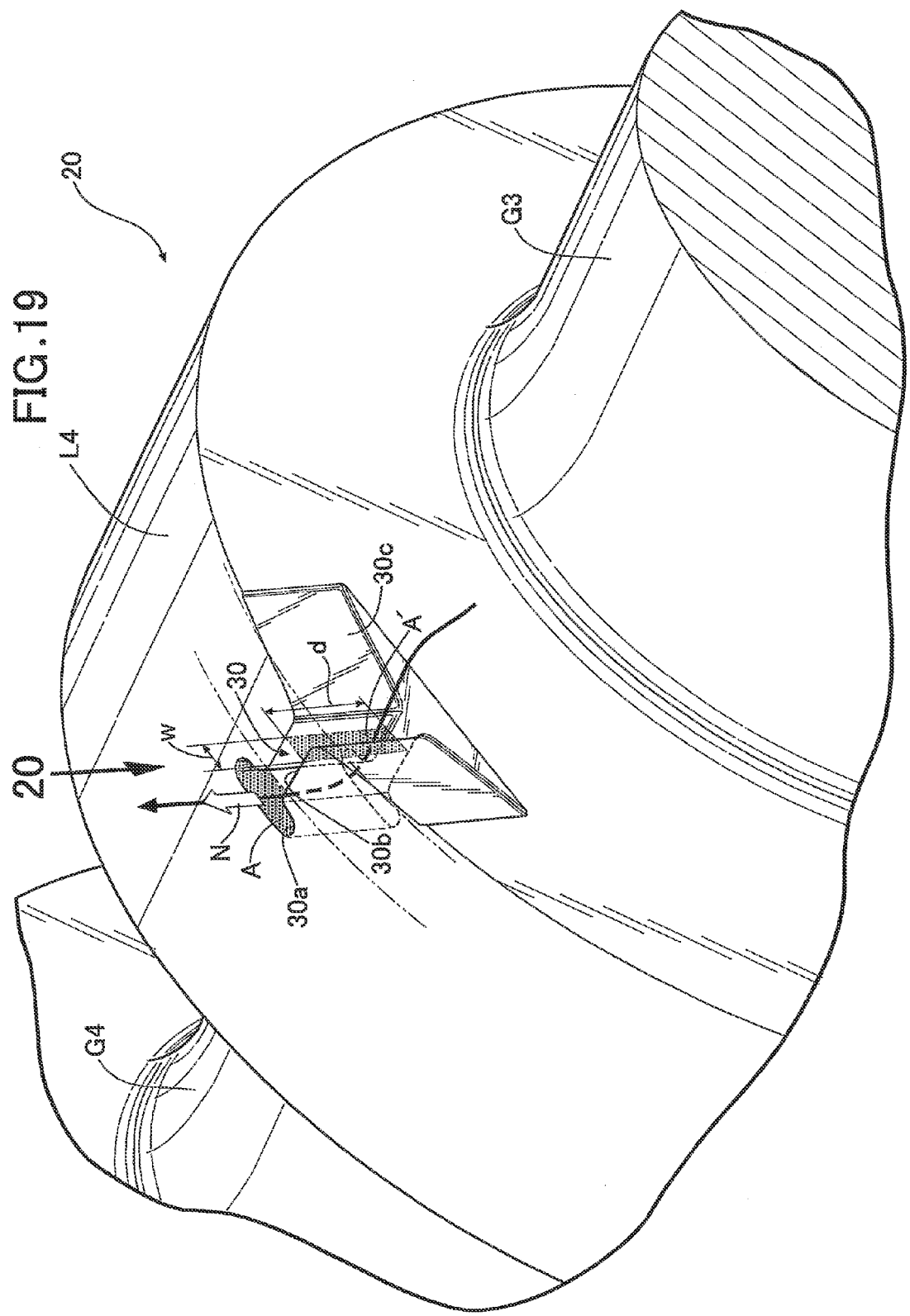

DRIVING POSITION (PARTIAL)

COMPARATIVE EXAMPLE

EMBODIMENT

REGENERATING POSITION (PARTIAL)

COMPARATIVE EXAMPLE

EMBODIMENT

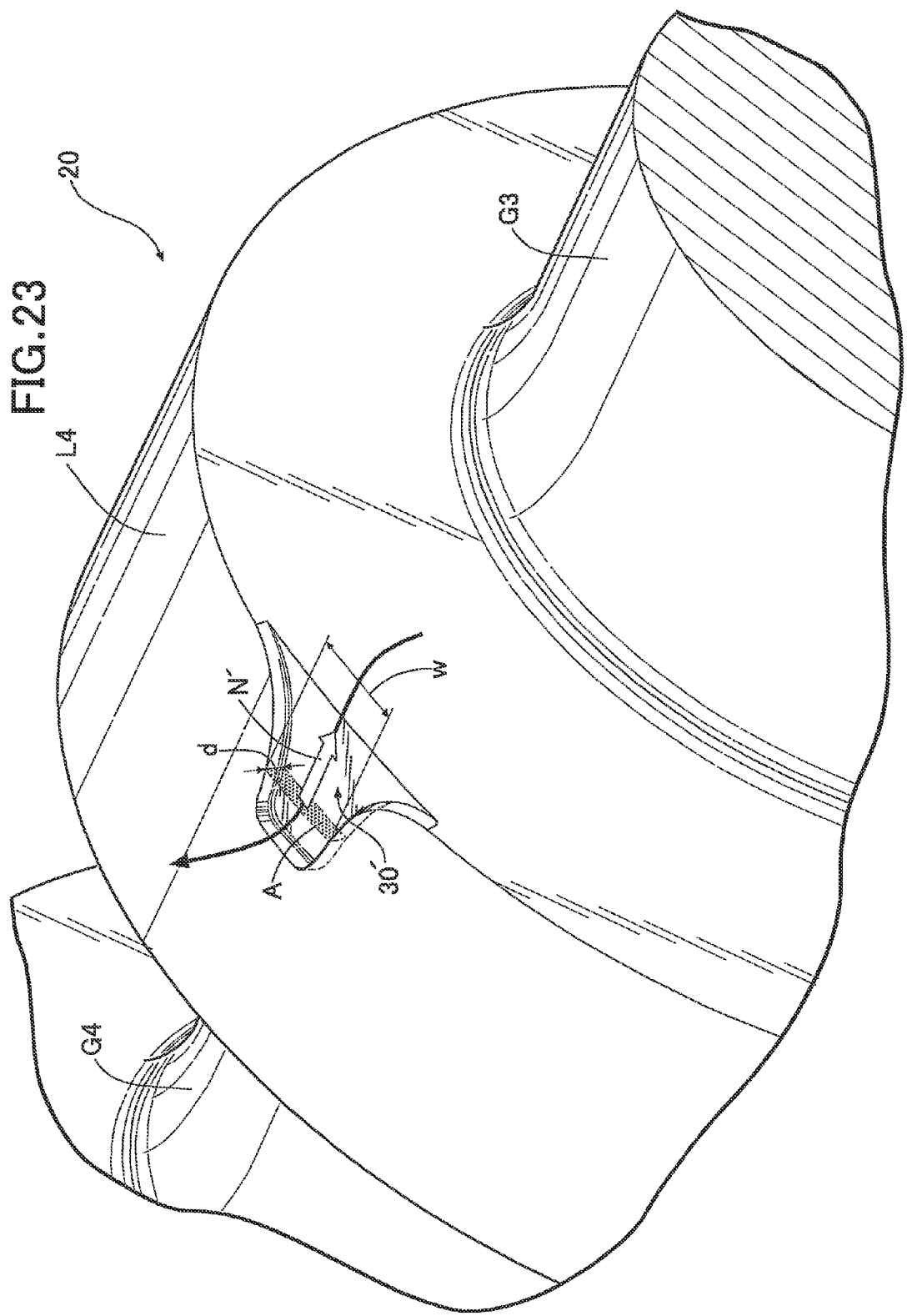

HYDRAULIC HYBRID VEHICLE

CROSS-REFERENCE TO RELATED APPLICATIONS

The present application claims priority under 35 USC 119 to Japanese Patent Application Nos. 2012-56805, 2012-56807 and 2012-56808 filed on Mar. 14, 2012 the entire contents of which are hereby incorporated by reference.

BACKGROUND OF THE INVENTION

1. Field of the Invention

The present invention relates to a hydraulic hybrid vehicle comprising: a power train including an engine and a transmission; a pump motor; and an accumulator, wherein the pump motor is driven as a motor by hydraulic pressure accumulated in the accumulator to effect travel of the vehicle, to assist the engine, or to start the engine, and the pump motor is driven as a pump by drive power from the engine or by drive power transmitted back from a drive wheel to accumulate pressure in the accumulator.

2. Description of the Related Art

Japanese Patent Application Laid-open No. 8-282324 has made known a hydraulic hybrid vehicle in which an engine is connected to front wheels through a transmission and a pump motor which functions as both a pump and a motor is connected to rear wheels, and, at the time of starting, the pump motor is driven as the motor by hydraulic pressure accumulated in an accumulator and, at the time of braking, the pump motor is driven as the pump by drive power transmitted back from the rear wheels thereby to accumulate pressure in the accumulator.

Japanese Patent Application Laid-open No. 6-107139 has also made known a hydraulic hybrid vehicle in which a drive shaft for transmitting drive power from an engine to a drive wheel is connected to a pump motor through a dog clutch and a gear box, and tooth breakage in the dog clutch is prevented by disengaging the dog clutch when the number of revolutions of the pump motor reaches its maximum permissible number of revolutions, and by engaging the dog clutch when a difference in revolution between the number of revolutions of the pump motor and the number of revolutions of the drive shaft becomes less than a permissible number of revolutions.

Incidentally, when such hydraulic hybrid vehicles include a power train formed of the engine and the transmission, an oil tank and a pump motor for a hydraulic hybrid system are necessary in addition to an oil pan and an oil pump for supplying hydraulic oil or lubricating oil to the power train, and the coexistence of these two hydraulic systems poses a problem of involving an increase in the number of parts, an increase in size of an apparatus, an increase in weight, an increase in cost, and the like.

SUMMARY OF THE INVENTION

The present invention has been made in view of the above-mentioned circumstances. An object of the present invention is to achieve a reduction in the number of parts, and hence reductions in size and weight and a reduction in cost of a hydraulic hybrid vehicle including a pump motor.

In order to achieve the object, according to a first feature of the present invention, there is provided a hydraulic hybrid vehicle comprising: a power train including an engine and a transmission; a pump motor; and an accumulator, wherein the pump motor is driven as a motor by hydraulic pressure accumulated in the accumulator to effect travel of the vehicle, to assist the engine, or to start the engine, and the pump motor is driven as a pump by drive power from the engine or by drive power transmitted back from a drive wheel to accumulate pressure in the accumulator, and wherein the pump motor also serves as a pump to supply hydraulic oil or lubricating oil to the power train.

With the above-described configuration, the pump motor can be driven as the motor by hydraulic pressure accumulated in the accumulator thereby to effect travel of the vehicle, to assist the engine, or to start the engine, and the pump motor can be driven as the pump by drive power from the engine or by drive power transmitted back from the drive wheel thereby to accumulate pressure in the accumulator. The pump motor of a hydraulic hybrid system also serves as the pump to supply hydraulic oil or lubricating oil to the power train, thus enabling elimination of an existing oil pump provided in the power train and hence reductions in the number of parts and cost, and, in addition, an existing oil pan provided in the power train and the like are utilized for the hydraulic hybrid system, which in turn enables achieving further reductions in the number of parts and cost. Moreover, when idle-reduction control is performed on the engine, during engine's stopped conditions, the pump motor can be driven as the motor by hydraulic pressure accumulated in the accumulator to start the engine and supply the hydraulic pressure to the transmission, thus eliminating a need to provide a motor-driven oil pump for the idle-reduction control and hence enabling a further reduction in cost.

According to a second feature of the present invention, in addition to the first feature, a crankshaft of the engine and a rotary shaft of the pump motor are connected together through power transmission means, and a delivery port of the pump motor and a main gallery of the engine are connected together through an oil path.

With the above-described configuration, the crankshaft of the engine and the rotary shaft of the pump motor arranged parallel to each other are connected together through the power transmission means, which in turn enables simplification of a structure of the power transmission means and hence an improvement in power transmission efficiency, and, in particular, the pump motor is driven as the motor thereby to enable enhancing ease of starting at the time of starting of the engine. Also, the delivery port of the pump motor and the main gallery of the engine are connected together through the oil path, and thus, the supply of hydraulic oil and lubricating oil from the pump motor to the engine can be efficiently accomplished by utilizing the existing main gallery.

According to a third feature of the present invention, in addition to the first feature, there is provided the hydraulic hybrid vehicle comprising: a spool valve configured to perform switching between oil paths to connect the power train, the pump motor and the accumulator, the spool valve including a spool having a land and a groove formed in an outer peripheral surface thereof, a valve housing having a plurality of ports formed in an inner peripheral surface of a spool hole in which the spool is slidably fitted, and a linear actuator configured to drive the spool, wherein the linear actuator changes a stroke position of the spool and thereby the land and the groove perform control to provide and close off communication between the plurality of ports, and an outer peripheral surface of the land is provided with a throttle groove and an opening area of the throttle groove is set so that a relationship between the stroke position of the spool and the amount of pressure drop varies substantially linearly.

With the above-described configuration, the opening area of the throttle groove formed in the outer peripheral surface of the land of the spool slidably fitted within the spool hole of the valve housing is set so that the relationship between the stroke position of the spool connected to and actuated by the linear actuator and the amount of pressure drop varies substantially linearly. Thus, the flow rate of oil can be changed at a certain ratio relative to a change in the stroke position of the spool, so that the linear actuator achieves an improvement in accuracy of control of the flow rate of oil. Moreover, the throttle groove effects a slow increase or decrease in the flow rate of oil and thus can prevent shock from being caused by a sharp change in the flow rate of oil.

According to a fourth feature of the present invention, in addition to the third feature, the throttle groove has a shape such that a depth in a radial direction of the land remains substantially constant and a width in a peripheral direction of the land varies nonlinearly along an axial direction.

With the above-described configuration, if, when the stroke position of the spool changes, the opening area of the throttle groove first increases slowly and finally increases sharply, the relationship between the stroke position and the amount of pressure drop varies substantially linearly; however, a shape such that the depth in the radial direction of the land remains substantially constant and the width in the peripheral direction of the land varies nonlinearly along the axial direction is adopted as the shape of the throttle groove, thus enabling any given setting of change characteristics of the opening area of the throttle groove, and, moreover, the depth of the throttle groove remains substantially constant, which in turn facilitates machining of the throttle groove.

According to a fifth feature of the present invention, in addition to the first feature, there is provided the hydraulic hybrid vehicle comprising: a spool valve configured to perform switching between oil paths to connect the power train, the pump motor and the accumulator, the spool valve including a spool having a land and a groove formed in an outer peripheral surface thereof, a valve housing having a plurality of ports formed in an inner peripheral surface of a spool hole in which the spool is slidably fitted, and a linear actuator configured to drive the spool, wherein the linear actuator changes a stroke position of the spool and thereby the land and the groove perform control to provide and close off communication between the plurality of ports, and a boundary between the land and the groove is provided with a throttle groove and a direction of a surface which forms a minimum opening portion of a flow path in the throttle groove is substantially orthogonal to an axial direction of the spool.

With the above-described configuration, in the throttle groove formed in the boundary between the land and the groove of the spool slidably fitted within the spool hole of the valve housing, the direction of the surface which forms the minimum opening portion of the flow path in the throttle groove is substantially orthogonal to the axial direction of the spool. Thus, even when high pressure develops on an upstream side of the minimum opening portion of the flow path and low pressure develops on a downstream side of the minimum opening portion of the flow path, a differential pressure between the high pressure and the low pressure merely biases the spool in the radial direction and does not bias the spool in the axial direction, and therefore, a load caused by the differential pressure is prevented from being added to or subtracted from thrust of the linear actuator, so that the linear actuator can achieve an improvement in accuracy of control of the stroke position of the spool. Moreover, the throttle groove effects a slow increase or decrease in the flow rate of oil and thus can prevent shock from being caused by a sharp change in the flow rate of oil.

According to a sixth feature of the present invention, in addition to the fifth feature, the surface which forms the minimum opening portion lies within the outer peripheral surface of the land.

With the above-described configuration, the surface which forms the minimum opening portion of the throttle groove lies within the outer peripheral surface of the land, and thus, the load caused by the differential pressure is directed orthogonal to the axial direction of the spool, so that the load added to or subtracted from the thrust of the linear actuator can be effectively prevented from being produced.

According to a seventh feature of the present invention, in addition to the first feature, there is provided the hydraulic hybrid vehicle comprising: a spool valve configured to perform switching between oil paths to connect the power train, the pump motor and the accumulator, the spool valve including a spool having a land and a groove formed in an outer peripheral surface thereof, a valve housing having a plurality of ports formed in an inner peripheral surface of a spool hole in which the spool is slidably fitted, and a linear actuator configured to drive the spool, wherein the linear actuator changes a stroke position of the spool and thereby the land and the groove perform control to provide and close off communication between the plurality of ports, and a boundary between the inner peripheral surface of the spool hole and the port is provided with a throttle groove and a direction of a surface which forms a minimum opening portion of a flow path in the throttle groove is substantially orthogonal to an axial direction of the spool.

With the above-described configuration, in the throttle groove formed in the boundary between the inner peripheral surface of the spool hole of the valve housing in which the spool is slidably fitted and the port, the direction of the surface which forms the minimum opening portion of the flow path in the throttle groove is substantially orthogonal to the axial direction of the spool. Thus, even when high pressure develops on an upstream side of the minimum opening portion of the flow path and low pressure develops on a downstream side of the minimum opening portion of the flow path, a differential pressure between the high pressure and the low pressure merely biases the spool in the radial direction and does not bias the spool in the axial direction, and therefore, a load caused by the differential pressure is prevented from being added to or subtracted from the thrust of the linear actuator, so that the linear actuator can achieve an improvement in accuracy of control of the stroke position of the spool. Moreover, the throttle groove effects a slow increase or decrease in the flow rate of oil and thus can prevent shock from being caused by a sharp change in the flow rate of oil.

According to an eighth feature of the present invention, in addition to the seventh feature, the surface which forms the minimum opening portion lies within the inner peripheral surface of the spool hole.

With the above-described configuration, the surface which forms the minimum opening portion of the throttle groove lies within the inner peripheral surface of the spool hole, and thus, the load caused by the differential pressure is directed orthogonal to the axial direction of the spool, so that the load added to or subtracted from the thrust of the linear actuator can be effectively prevented from being produced.

Here, a sleeve 12 of embodiments corresponds to the valve housing of the present invention; a linear solenoid 15 of the embodiments corresponds to the linear actuator of the present invention; and an endless chain 52 of the embodiments corresponds to the power transmission means of the present invention.

The above and other objects, characteristics and advantages of the present invention will be clear from detailed descriptions of the preferred embodiments which will be provided below while referring to the attached drawings.

BRIEF DESCRIPTION OF THE DRAWINGS

FIG. 1 is a longitudinal sectional view of a spool valve as being in a neutral position;

FIG. 2 is a longitudinal sectional view of the spool valve as being in a driving position;

FIG. 3 is a longitudinal sectional view of the spool valve as being in an accumulating position;

FIG. 4 is a longitudinal sectional view of an engine; and

FIG. 5 is a view seen from a direction of an arrow 5 in FIG. 4.

FIG. 6 is a longitudinal sectional view of the spool valve as being in the neutral position;

FIG. 7 is a longitudinal sectional view of the spool valve as being in the driving position (full stroke);

FIG. 8 is a longitudinal sectional view of the spool valve as being in the driving position (partial);

FIG. 9 is a longitudinal sectional view of the spool valve as being in a regenerating position (full stroke);

FIG. 10 is a longitudinal sectional view of the spool valve as being in the regenerating position (partial);

FIG. 11 is an enlarged view seen from a direction of an arrow 11 in FIG. 6; and

FIG. 12 is a graph illustrating a relationship of the amount of pressure drop and opening area to the stroke position of a spool.

FIGS. 14 to 23 illustrate a fifth embodiment of the present invention:

FIG. 14 is a longitudinal sectional view of the spool valve as being in the neutral position;

FIG. 15 is a longitudinal sectional view of the spool valve as being in the driving position (full stroke);

FIG. 16 is a longitudinal sectional view of the spool valve as being in the driving position (partial);

FIG. 17 is a longitudinal sectional view of the spool valve as being in the regenerating position (full stroke);

FIG. 18 is a longitudinal sectional view of the spool valve as being in the regenerating position (partial);

FIG. 19 is an enlarged view seen from a direction of an arrow 19 in FIG. 14;

FIG. 23 is a view illustrating the shape of a throttle groove of Comparative Example.

DETAILED DESCRIPTION OF THE PREFERRED EMBODIMENTS

A first embodiment of the present invention will be described below with reference to FIGS. 1 to 5.

Figure 1:
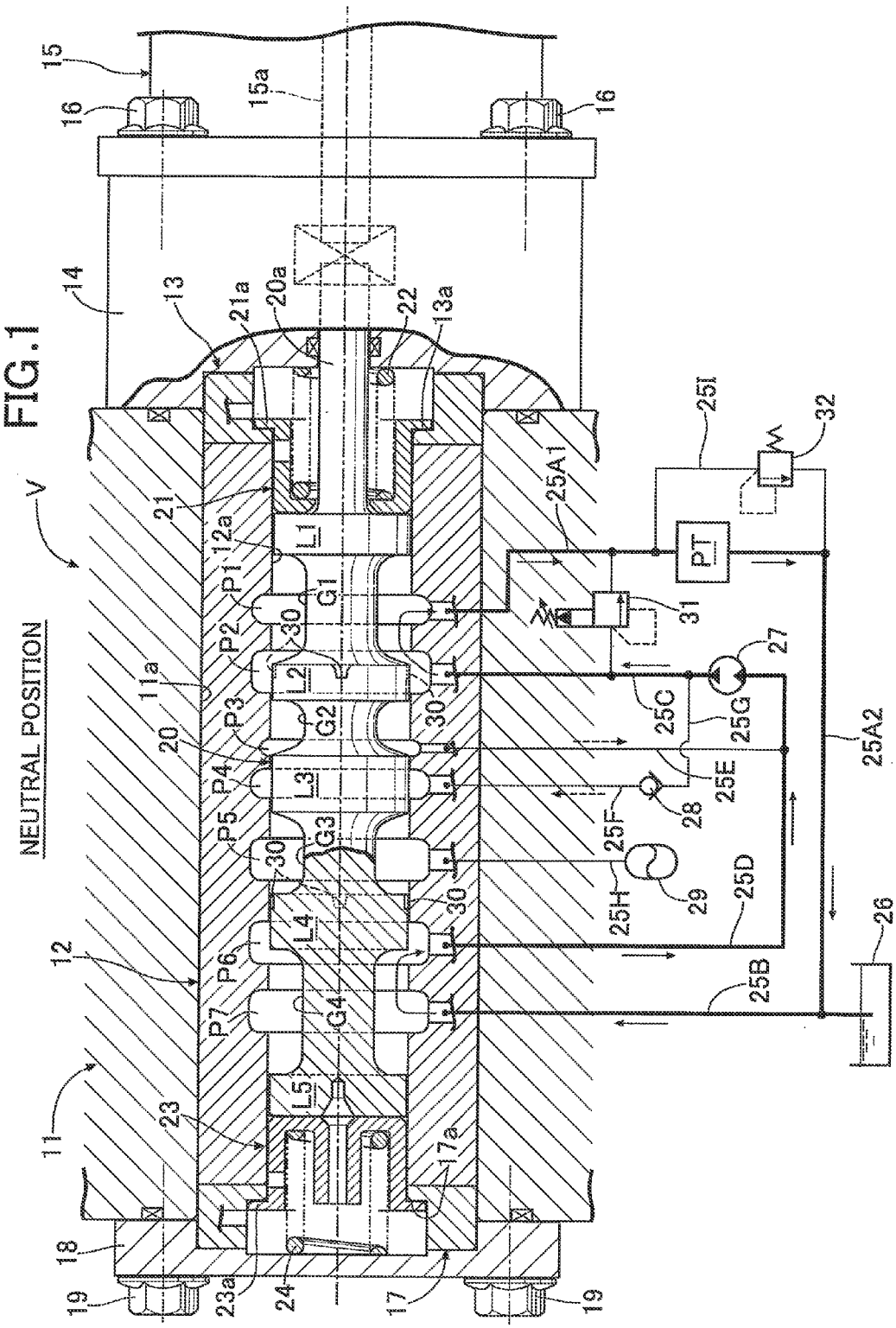
FIGS. 1 to 5 illustrate a first embodiment of the present invention.

As illustrated in FIG. 1, a spool valve V for use in a hydraulic hybrid system for an automobile is provided with a cylindrical sleeve 12 fitted in a sleeve supporting hole 11a formed in a valve case 11, and a solenoid supporting member 14 covering an outer surface of an annular first end plate 13 which abuts against one end of the sleeve 12 is fastened together with a linear solenoid 15 to one side surface of the valve case 11 by plural bolts 16, and a cover member 18 covering an outer surface of an annular second end plate 17 which abuts against the other end of the sleeve 12 is fastened to the other side surface of the valve case 11 by plural bolts 19. A spool 20 is axially slidably fitted within a spool hole 12a formed in the sleeve 12, and a tip end of a rod portion 20a extending from one end of the spool 20 and a tip end of an output rod 15a of the linear solenoid 15 are connected together.

A hat-shaped first spring seat 21 through which the rod portion 20a of the spool 20 extends is slidably fitted in the spool hole 12a and the first end plate 13 on their inner peripheral surfaces, and the first spring seat 21 biased toward the spool 20 by a first spring 22 provided in compression between the first spring seat 21 and the solenoid supporting member 14 is stopped in a position such that a flanged portion 21a of the first spring seat 21 abuts against a stepped portion 13a of the first end plate 13. Also, a hat-shaped second spring seat 23 is slidably fitted in the spool hole 12a and the second end plate 17 on their inner peripheral surfaces, and the second spring seat 23 biased toward the spool 20 by a second spring 24 provided in compression between the second spring seat 23 and the cover member 18 is stopped in a position such that a flanged portion 23a of the second spring seat 23 abuts against a stepped portion 17a of the second end plate 17.

In this state, the spool 20 is positioned in a neutral position with its opposite portions sandwiched between the first spring seat 21 and the second spring seat 23. When the linear solenoid 15 is excited in one direction to effect forward movement of the output rod 15a, the spool 20 moves left in FIG. 1, and thereby, the second spring seat 23 pressed by the spool 20 moves left while compressing the second spring 24. This position is called a driving position (refer to FIG. 2). Also, when the linear solenoid 15 is excited in the other direction to effect backward movement of the output rod 15a, the spool 20 moves right in FIG. 1, and thereby, the first spring seat 21 pressed by the spool 20 moves right while compressing the first spring 22. This position is called an accumulating position (refer to FIG. 3).

The linear solenoid 15 can effect forward or backward movement of the output rod 15a to any given position and thus the spool 20 can travel in a stroke to any given position, and the spool valve V, when in the driving position and the accumulating position, serves the function of acting as a throttle valve to control the flow rate of oil.

The inner peripheral surface of the spool hole 12a of the sleeve 12 is provided with annular first to seventh ports P1 to P7 formed in order from a right end side to a left end side of the inner peripheral surface. Also, an outer peripheral surface of the spool 20 is provided with large-diameter first to fifth lands L1 to L5 formed in order from the right end side to the left end side of the outer peripheral surface, and is provided with small-diameter first to fourth grooves G1 to G4 formed in order in such a way as to be sandwiched between the first to fifth lands L1 to L5. An outside diameter of the first to fifth lands L1 to L5 is equal to an inside diameter of the spool hole 12a, and sealing is formed so as not to allow the passage of oil at positions at which outer peripheral surfaces of the first to fifth lands L1 to L5 abut against the inner peripheral surface of the spool hole 12a.

A portion, facing the first groove G1, of the outer peripheral surface of the second land L2 of the spool 20, and a portion, facing the third groove G3, of the outer peripheral surface of the fourth land L4 of the spool 20 are each provided with four throttle grooves 30 formed at peripherally 90° spaced intervals. The throttle grooves 30 enable controlling the flow rate of oil according to the stroke position of the spool 20.

As illustrated in FIG. 1, the first port P1 communicates with an oil tank 26 through oil paths 25A1, 25A2 connected in series, the seventh port P7 communicates with the oil tank 26 through an oil path 25B, the second port P2 communicates with a delivery side of a pump motor 27 through an oil path 25C, the sixth port P6 communicates with a suction side of the pump motor 27 through an oil path 25D, the third port P3 communicates with the oil path 25D through an oil path 25E, the fourth port P4 communicates with the oil path 25C through an oil path 25F, a check valve 28 and an oil path 25G, and the fifth port P5 communicates with an accumulator 29 through an oil path 25H.

The oil path 25C communicating with the downstream side of the pump motor 27 is connected via a solenoid relief valve 31 to the oil path 25A1 communicating with the upstream side of a power train PT formed of an engine and a transmission, and the oil path 25A2 communicating with the downstream side of the power train PT is connected to the oil tank 26. Then, a relief valve 32 is interposed in an oil path 25I which bypasses around the oil path 25A1 and the oil path 25A2.

Figure 4:
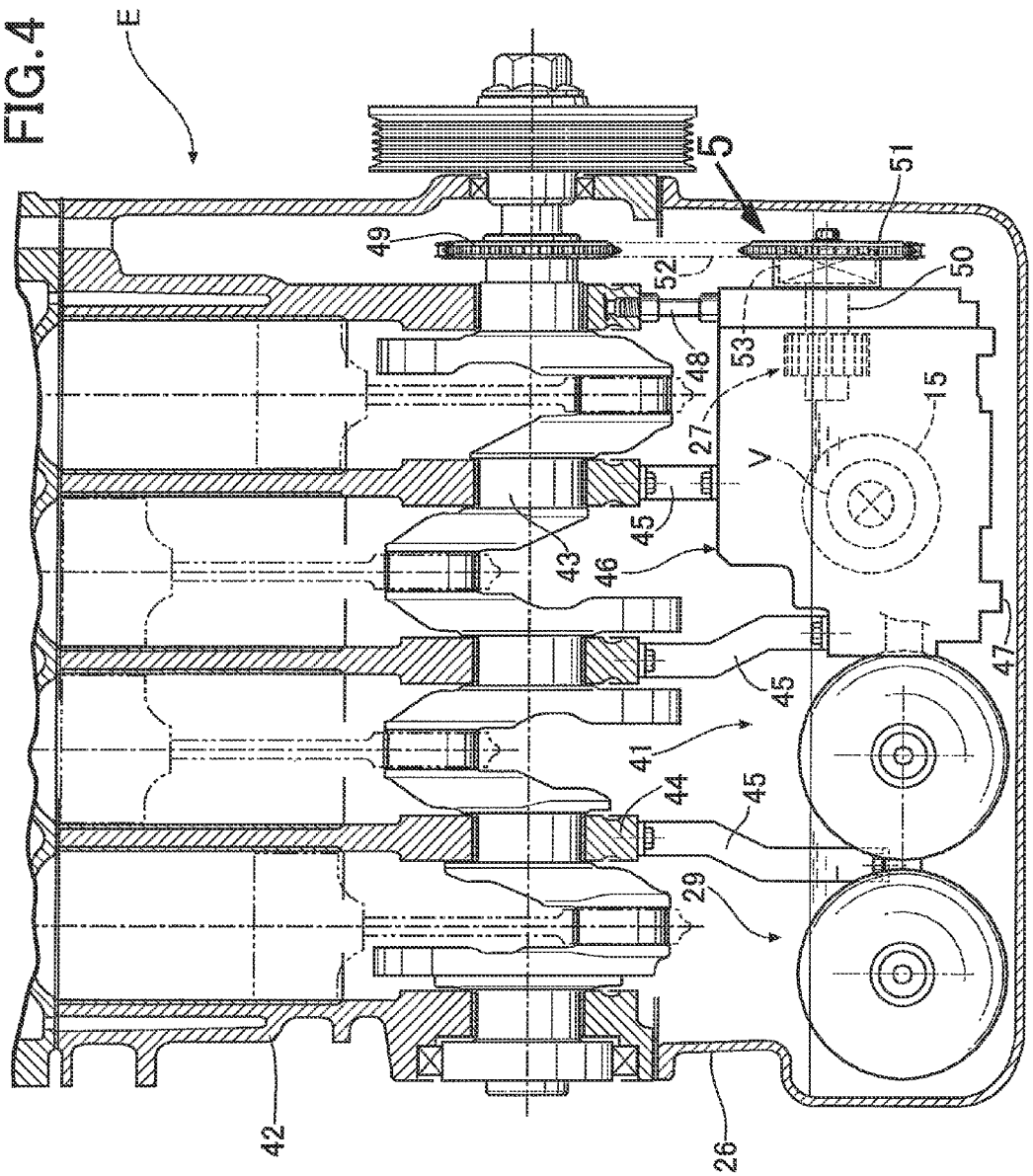
Figure 5:
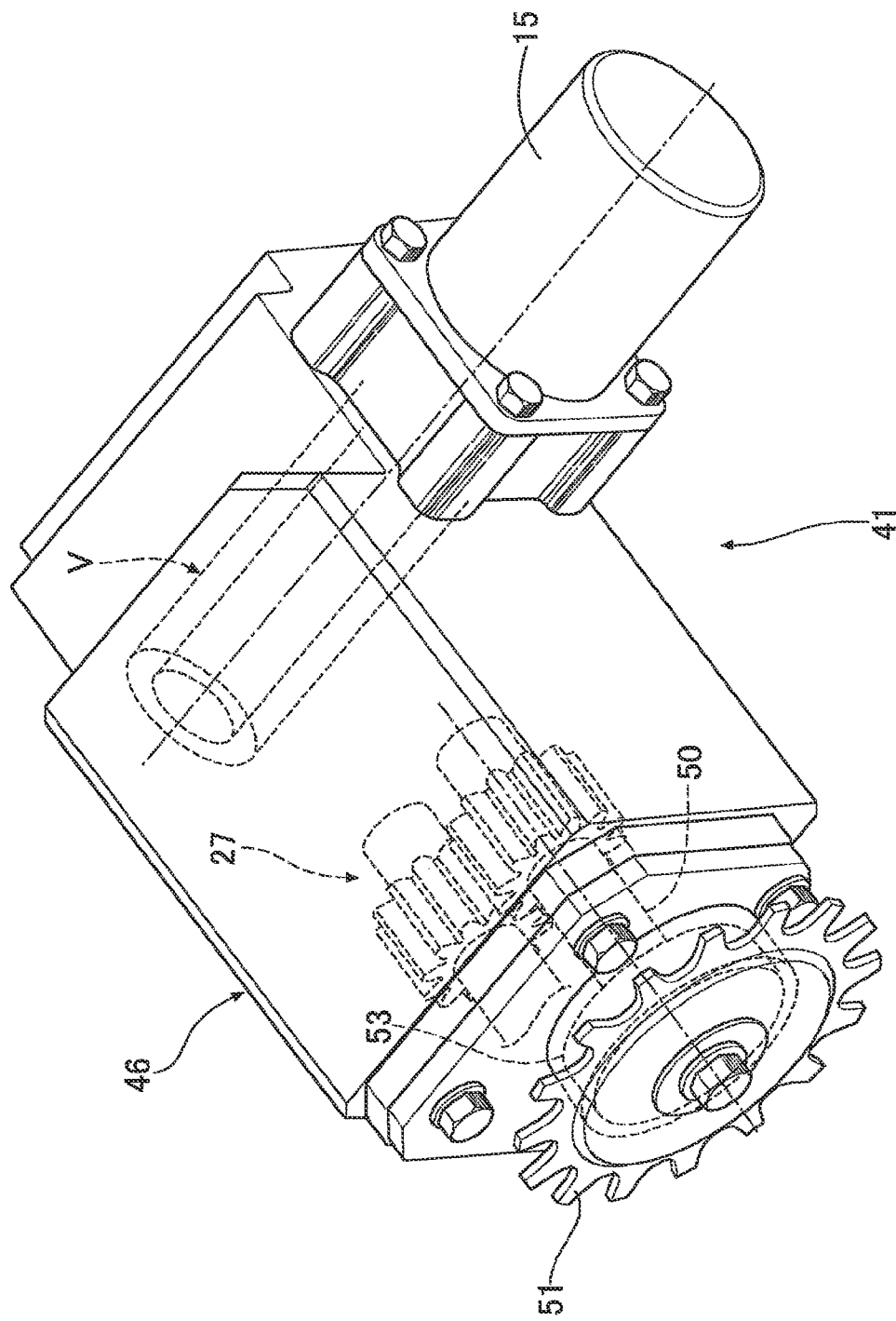

As illustrated in FIGS. 1, 4 and 5, a hydraulic hybrid system 41 of the present embodiment is housed within an existing oil pan fastened to a lower surface of a cylinder block 42 of an engine E. The oil pan also serves as the oil tank 26 of the hydraulic hybrid system 41. The hydraulic hybrid system 41 is suspended and supported by plural brackets 45 from a lower surface of a lower block 44 which supports a crankshaft 43 on the cylinder block 42. A pump motor 27 formed of the spool valve V and an external gear pump is housed within a casing 46 of the hydraulic hybrid system 41, and the linear solenoid 15 for actuating the spool valve V is fixed externally of the casing 46. Also, the accumulator 29 formed of four spheres is connected to a rear portion of the casing 46.

A lower portion of the casing 46 is provided with a suction port 47 communicating with an internal space of the oil tank 26, and an oil supply piping 48 extending from an upper portion of the casing 46 is connected to an oil path in the lower block 44. Oil fed through the oil path in the lower block 44 into a main gallery (unillustrated) formed in the cylinder block is supplied as hydraulic oil or lubricating oil to parts of the engine E. Also, the engine E and the transmission which form the power train PT share a hydraulic system and a lubricating system with each other, and thereby, the oil in the main gallery of the engine E can be supplied also to the transmission.

An endless chain 52 is wrapped on a first sprocket 49 provided on a shaft end of the crankshaft 43 and a second sprocket 51 provided on a rotary shaft 50 of the pump motor 27, and an electromagnetic clutch 53 is provided between the second sprocket 51 and the rotary shaft 50 of the pump motor 27. This enables two-way transmission of torque from one to another of the crankshaft 43 and the pump motor 27.

In the driving state of the hydraulic hybrid system 41, therefore, the pump motor 27 functions as a motor by hydraulic pressure accumulated in the accumulator 29 thereby to transmit its torque to the crankshaft 43 through the second sprocket 51, the endless chain 52 and the first sprocket 49 and thus enable assisting the drive power from the engine E, cranking the engine E, or causing a vehicle to travel with the engine E in a stopped state. In the accumulating state of the hydraulic hybrid system 41, the pump motor 27 functions as a pump by torque transmitted from the engine E through the first sprocket 49, the endless chain 52 and the second sprocket 51 or by torque transmitted back from a drive wheel via the above-described route thereby to enable applying pressure to oil in the oil tank 26 and thus accumulating pressure in the accumulator 29. In the neutral state of the hydraulic hybrid system 41, the pump motor 27 is operated as a pump under low-load conditions thereby to supply hydraulic oil or lubricating oil to the power train PT.

Next, description will be given with regard to operations of the embodiment of the present invention having the above-described configuration.

Figure 2:
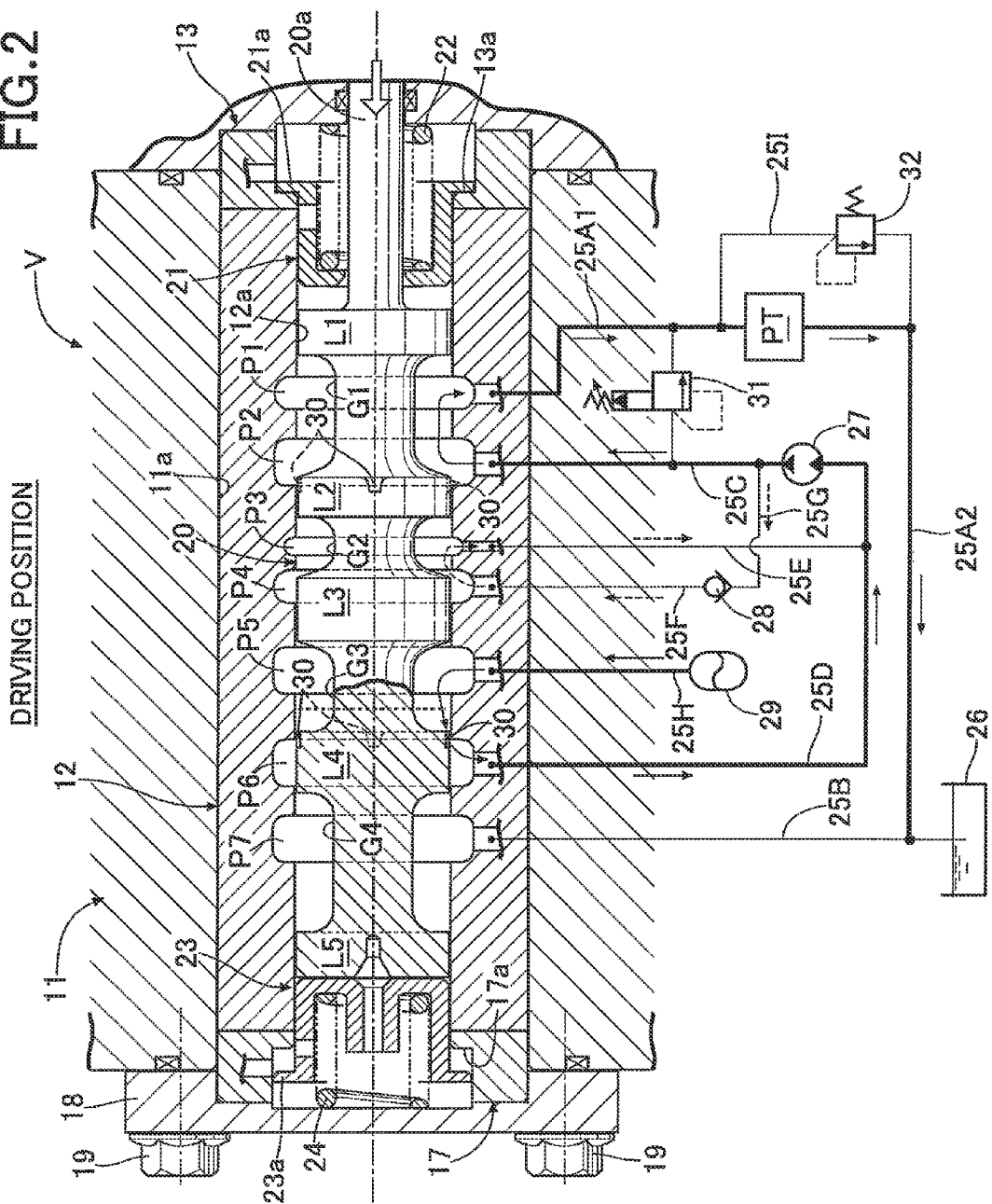

FIG. 2 illustrates the spool 20 as being in the left-moved, driving position. The first groove G1 provides communication between the first port P1 and the second port P2, the second groove G2 provides communication between the third port P3 and the fourth port P4, the third groove G3 provides communication between the fifth port P5 and the sixth port P6, and the fourth land L4 closes off communication between the remaining seventh port P7 and the other ports.

Consequently, hydraulic pressure accumulated in the accumulator 29 flows into the oil tank 26 in turn by way of the oil path 25H, the fifth port P5, the third groove G3, the sixth port P6, the oil path 25D, the pump motor 27, the oil path 25C, the second port P2, the first groove G1, the first port P1, and the oil paths 25A1, 25A2, and the pump motor 27 is driven as the motor by the hydraulic pressure accumulated in the accumulator 29 thereby to enable generating drive power for traveling, assisting the drive power from the engine, or cranking the engine E.

The power train PT is disposed between the oil paths 25A1, 25A2 from the first port P1 of the spool valve V back to the oil tank 26, and the engine E and the transmission of the power train PT can utilize oil delivered by the pump motor 27 as hydraulic oil for a valve operating mechanism or a transmission mechanism or as lubricating oil for parts to be lubricated.

When pressure in the accumulator 29 falls and hence drive power declines, oil circulates by flowing from the oil path 25C on the downstream side of the pump motor 27 to the oil path 25D on the upstream side of the pump motor 27 in turn by way of the oil path 25G, the fourth port P4, the second groove G2, the third port P3, and the oil path 25E, and thereby, a loss of drive power in the pump motor 27 can be reduced. Also, when hydraulic pressure in the oil path 25A1 on the upstream side of the power train PT becomes excessively high, the relief valve 32 provided in the oil path 25I is opened so that an excess of oil can be bypassed to flow into the oil path 25A2 on the downstream side of the power train PT.

Figure 3:
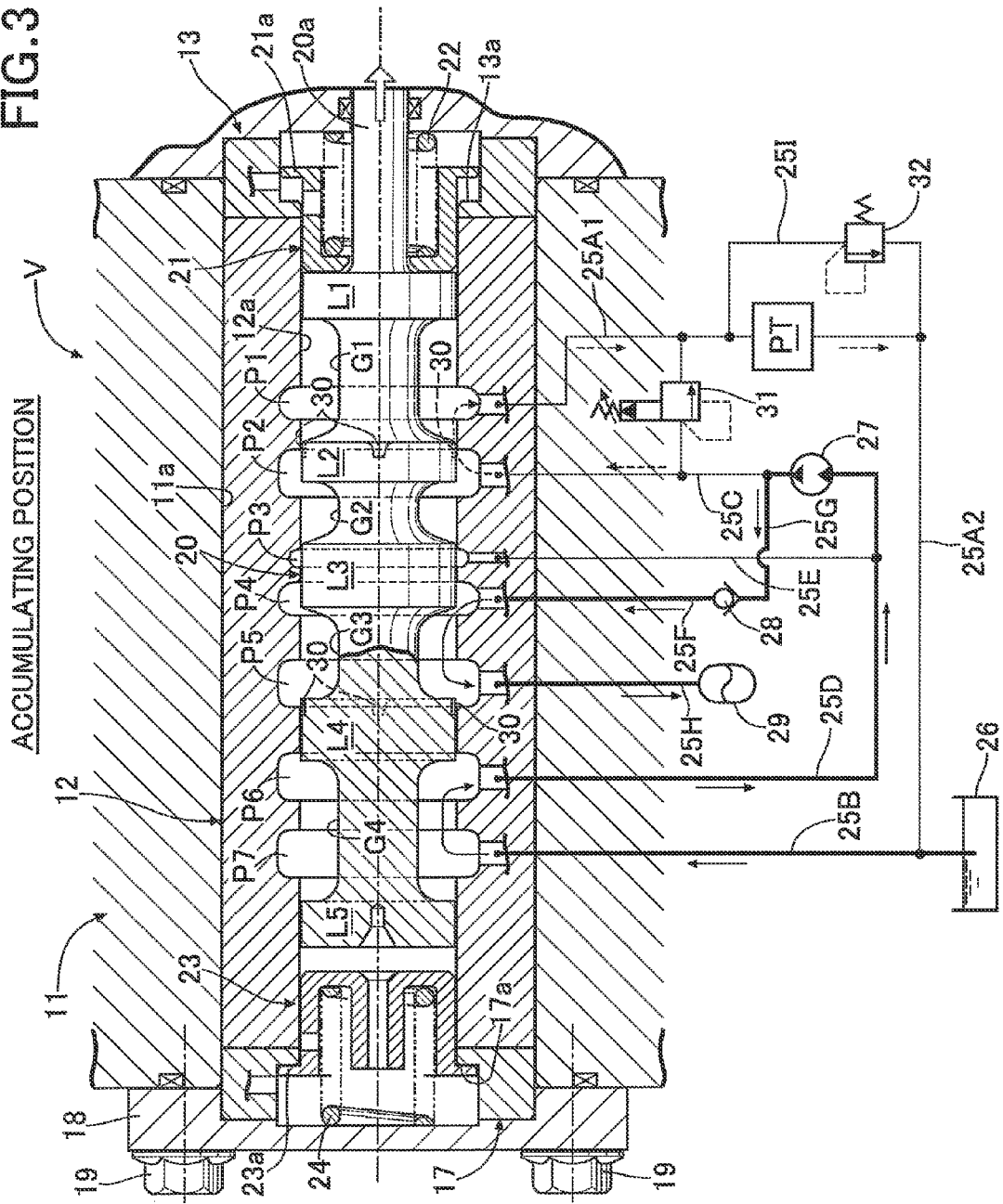

Also, FIG. 3 illustrates the spool 20 as being in the right-moved, accumulating position. The third groove G3 provides communication between the fourth port P4 and the fifth port P5, the fourth groove G4 provides communication between the sixth port P6 and the seventh port P7, and the second land L2 and the third land L3 close off communication between the remaining first, second and third ports P1, P2, P3 and the other ports.

Consequently, the pump motor 27 is driven as the pump by drive power transmitted back from the drive wheel or by drive power from the engine E, and thereby, oil in the oil tank 26 flows into the accumulator 29 in turn by way of the oil path 25B, the seventh port P7, the fourth groove G4, the sixth port P6, the oil path 25D, the pump motor 27, the oil path 25C, the oil path 25G, the check valve 28, the oil path 25F, the fourth port P4, the third groove G3, the fifth port P5, and the oil path 25H, so that the pressurized oil can be accumulated in the accumulator 29.

In this accumulating position, a portion of oil delivered by the pump motor 27 flows into the oil tank 26 in turn by way of the oil path 25C, the solenoid relief valve 31, and the oil paths 25A1, 25A2, and the flow rate of the oil is adjusted by an opening degree of the solenoid relief valve 31 thereby to enable supplying a portion of the oil as hydraulic oil or lubricating oil to the power train PT disposed in this route.

In the neutral position illustrated in FIG. 1, the first groove G1 provides communication between the first port P1 and the second port P2, the fourth groove G4 provides communication between the sixth port P6 and the seventh port P7, and the second land L2, the third land L3 and the fourth land L4 close off communication between the remaining third, fourth and fifth ports P3, P4, P5 and the other ports.

Consequently, when the pump motor 27 functions as the pump by drive power transmitted back from the drive wheel or by drive power from the engine E, oil delivered by the pump motor 27 is circulated in turn by way of the oil path 25C, the second port P2, the first groove G1, the first port P1, the oil paths 25A1, 25A2, the oil path 25B, the seventh port P7, the fourth groove G4, the sixth port P6, the oil path 25D, and the pump motor 27, and thereby, the pump motor 27 can be operated under low-load conditions.

Also in this case, as in the case of the above-described driving position (refer to FIG. 2), oil can be supplied as hydraulic oil or lubricating oil to the power train PT, and an excess of oil is bypassed by the relief valve 32 when hydraulic pressure in the oil path 25A1 becomes excessively high.

According to the present embodiment, as described above, the pump motor 27 of the hydraulic hybrid system 41 also serves as the oil pump to supply hydraulic oil or lubricating oil to the power train PT, and thus, it becomes unnecessary to provide an oil pump specifically designed to supply hydraulic oil or lubricating oil to the power train PT, which in turn enables achieving a reduction in the number of parts, a reduction in weight, and a size reduction of the power train PT, a reduction in cost, and the like. Moreover, the existing oil pan (the oil tank 26) provided in the power train PT and oil are utilized for the hydraulic hybrid system 41, and thus, the numbers of oil filters, oil temperature sensors, oil temperature controllers, and the like can be reduced.

Also, the hydraulic hybrid system 41 is housed within the oil pan (the oil tank 26) of the engine E. This not only enables preventing an increase in size of the power train PT due to the provision of the hydraulic hybrid system 41 and thus enhancing vehicle mountability, but also enables an anti-vibration mount of the engine E to absorb vibrations or noise produced by the hydraulic hybrid system 41 and thus enables enhancing quietness of the vehicle.

Also, a vehicle in which idle-reduction control is performed on an engine needs to be provided with a motor-driven hydraulic pump separately from an engine-operated oil pump so that hydraulic pressure is raised and supplied to a transmission by the motor-driven hydraulic pump during no-idling conditions, for the purpose of supplying the hydraulic pressure for speed change to the transmission without delay at the time of starting after the no-idling conditions. According to the present embodiment, however, at the time of starting after no-idling conditions of the engine, the pump motor 27 can be driven as the motor by hydraulic pressure accumulated in the accumulator 29 to start the engine E and, in addition, return oil from the pump motor 27 can be supplied as hydraulic oil to the transmission to change speed for starting, which in turn enables eliminating the need for the motor-driven hydraulic pump for the idle-reduction control and hence achieving reductions in the number of parts and cost. The pump motor 27 having much higher torque than that of an electric starting motor, in particular, is used as a starting motor and thus can start the engine E in a shorter time as compared to the electric starting motor.

Also, the crankshaft 43 of the engine E and the rotary shaft 50 of the pump motor 27 of the hydraulic hybrid system 41 are arranged parallel to each other and connected together by the endless chain 52, thus enabling simplification of a structure of a drive power transmission mechanism between the crankshaft 43 and the pump motor 27 and also enabling minimization of a transmission loss of drive power and hence enhancement of ease of starting and quietness when the pump motor 27 cranks the engine E to start it.

Next, a second embodiment of the present invention will be described with reference to FIGS. 6 to 12.

Figure 6:
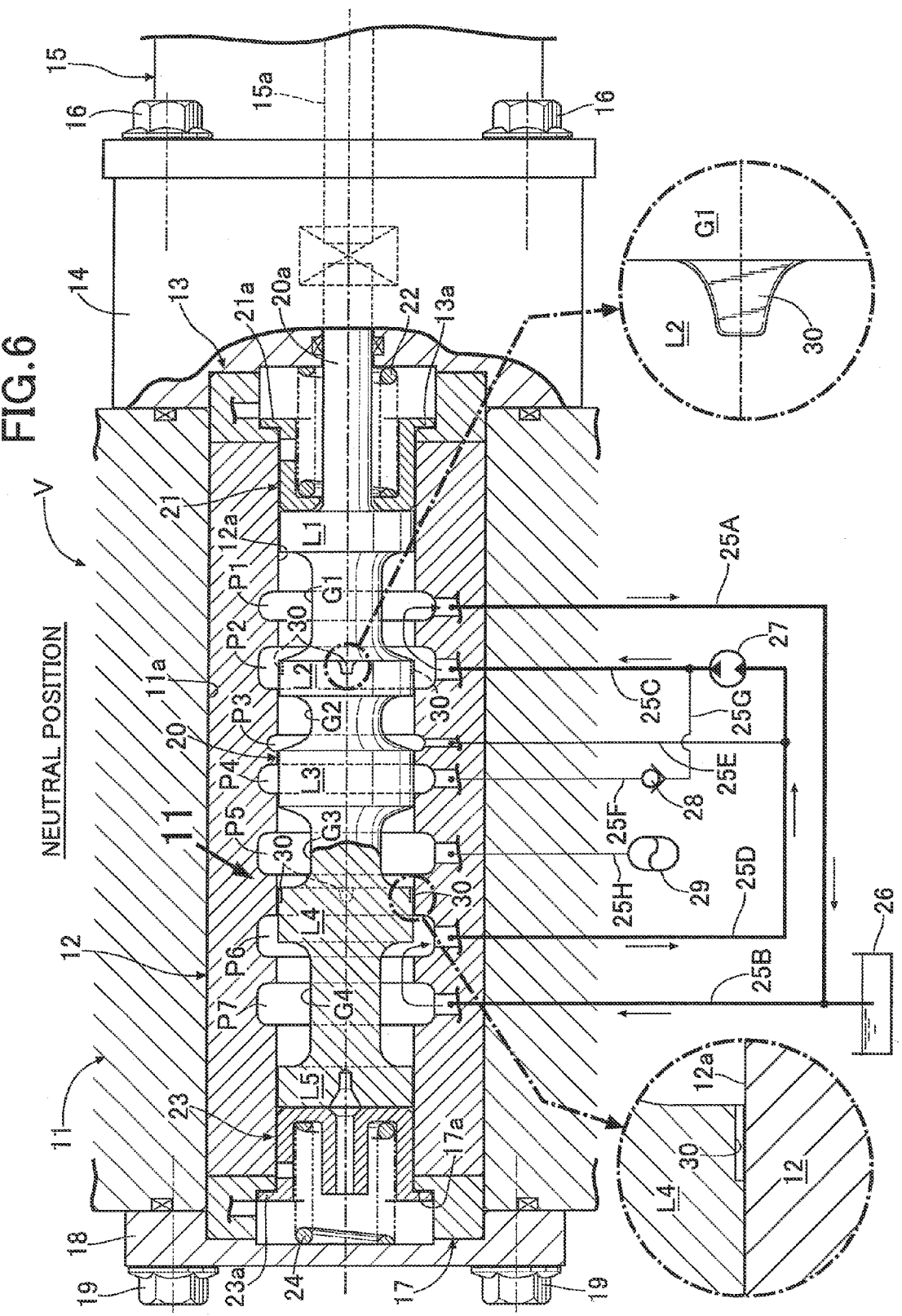
FIGS. 6 to 12 illustrate a second embodiment of the present invention.

As illustrated in FIG. 6, the spool valve V for use in a hydraulic hybrid system for an automobile is provided with the cylindrical sleeve 12 fitted in the sleeve supporting hole 11a formed in the valve case 11, and the solenoid supporting member 14 covering the outer surface of the annular first end plate 13 which abuts against one end of the sleeve 12 is fastened together with the linear solenoid 15 to one side surface of the valve case 11 by the plural bolts 16, and the cover member 18 covering the outer surface of the annular second end plate 17 which abuts against the other end of the sleeve 12 is fastened to the other side surface of the valve case 11 by the plural bolts 19. The spool 20 is axially slidably fitted within the spool hole 12a formed in the sleeve 12, and the tip end of the rod portion 20a extending from one end of the spool 20 and the tip end of the output rod 15a of the linear solenoid 15 are connected together.

The hat-shaped first spring seat 21 through which the rod portion 20a of the spool 20 extends is slidably fitted in the spool hole 12a and the first end plate 13 on their inner peripheral surfaces, and the first spring seat 21 biased toward the spool 20 by the first spring 22 provided in compression between the first spring seat 21 and the solenoid supporting member 14 is stopped in a position such that the flanged portion 21a of the first spring seat 21 abuts against the stepped portion 13a of the first end plate 13. Also, the hat-shaped second spring seat 23 is slidably fitted in the spool hole 12a and the second end plate 17 on their inner peripheral surfaces, and the second spring seat 23 biased toward the spool 20 by the second spring 24 provided in compression between the second spring seat 23 and the cover member 18 is stopped in a position such that the flanged portion 23a of the second spring seat 23 abuts against the stepped portion 17a of the second end plate 17.

In this state, the spool 20 is positioned in the neutral position with its opposite portions sandwiched between the first spring seat 21 and the second spring seat 23. When the linear solenoid 15 is excited in one direction to effect forward movement of the output rod 15a, the spool 20 moves left in FIG. 6, and thereby, the second spring seat 23 pressed by the spool 20 moves left while compressing the second spring 24. This position is called the driving position (refer to FIGS. 7 and 8). Also, when the linear solenoid 15 is excited in the other direction to effect backward movement of the output rod 15a, the spool 20 moves right in FIG. 6, and thereby, the first spring seat 21 pressed by the spool 20 moves right while compressing the first spring 22. This position is called a regenerating position (refer to FIGS. 9 and 10).

Figure 7:
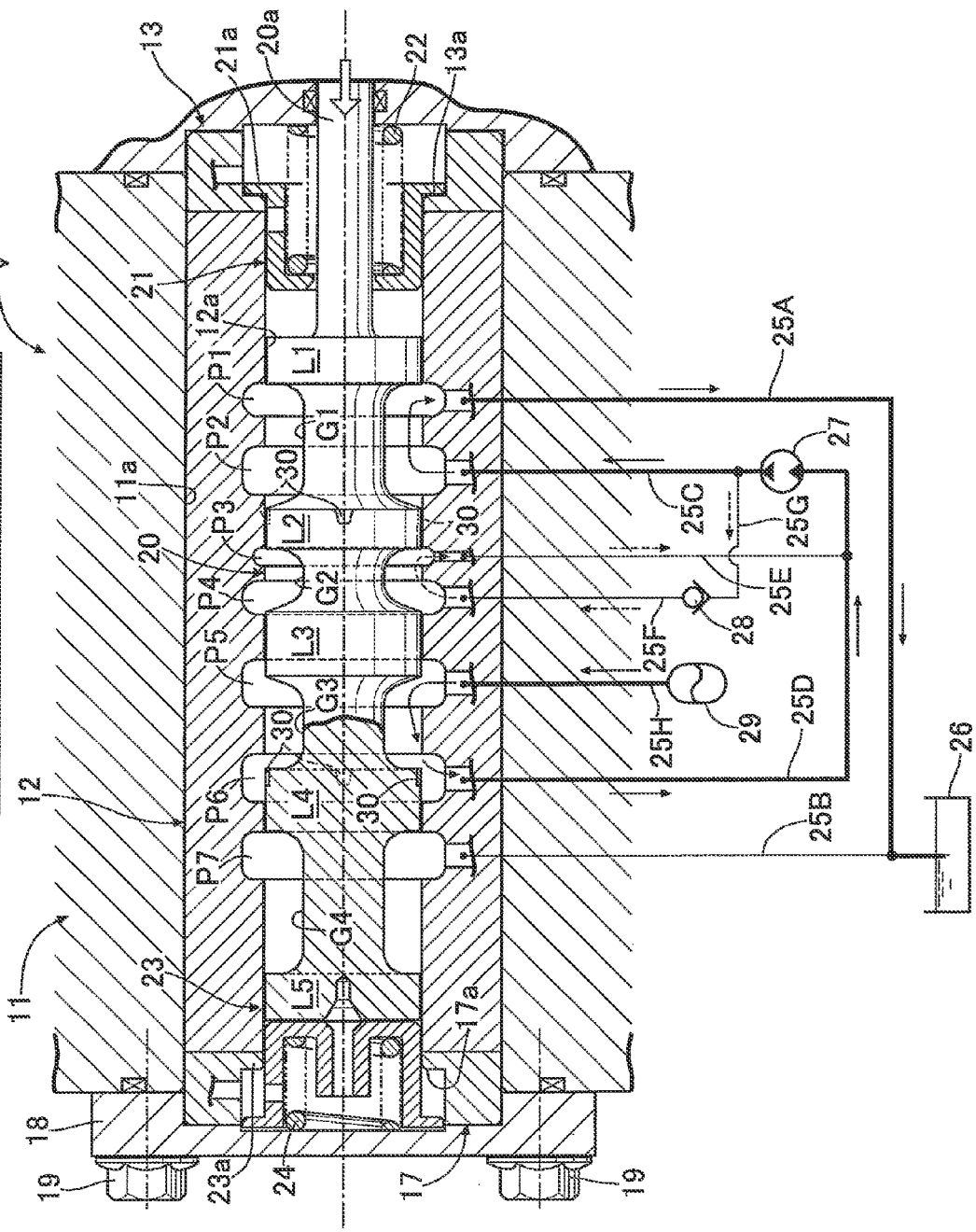
Figure 8:
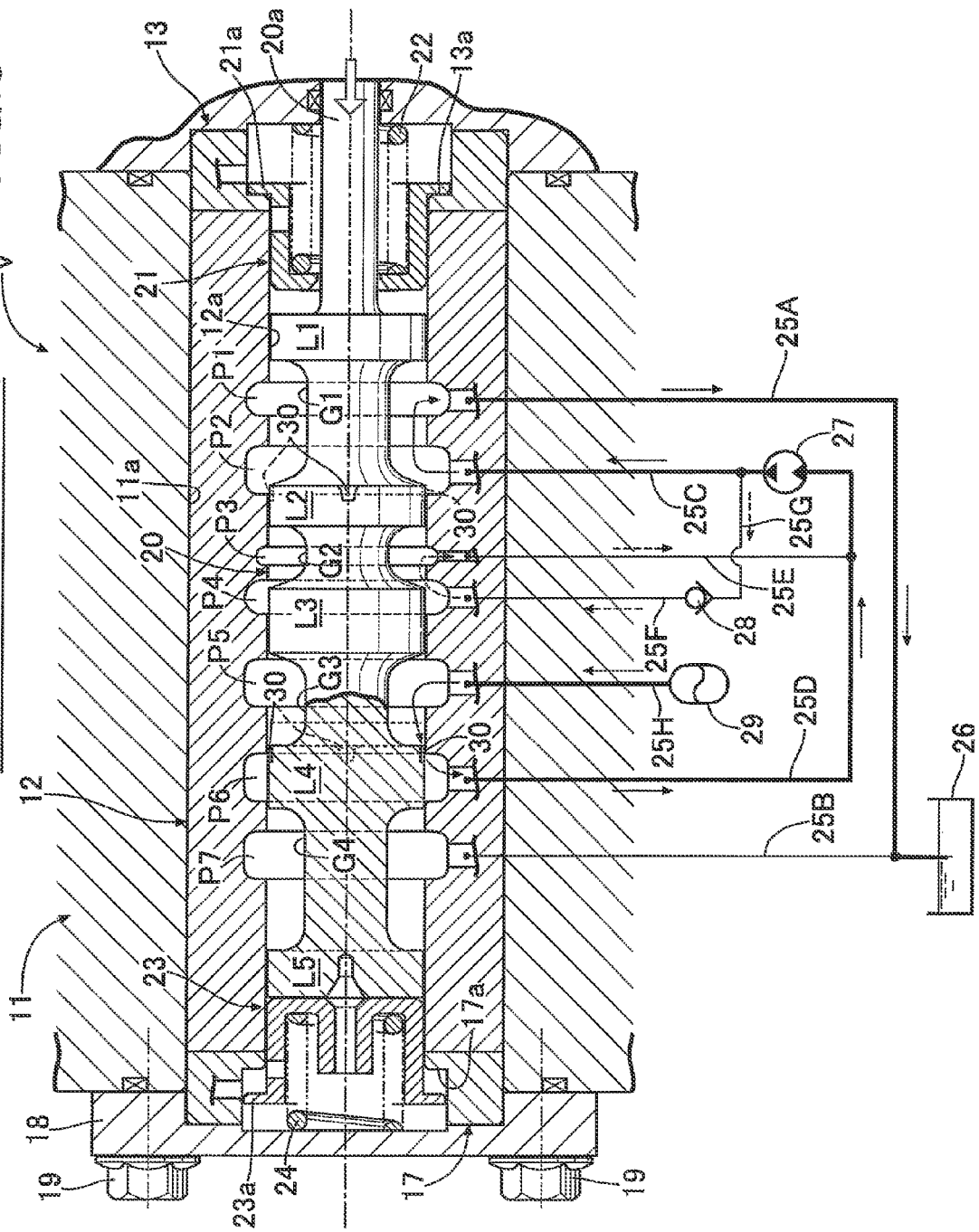
Figure 9:
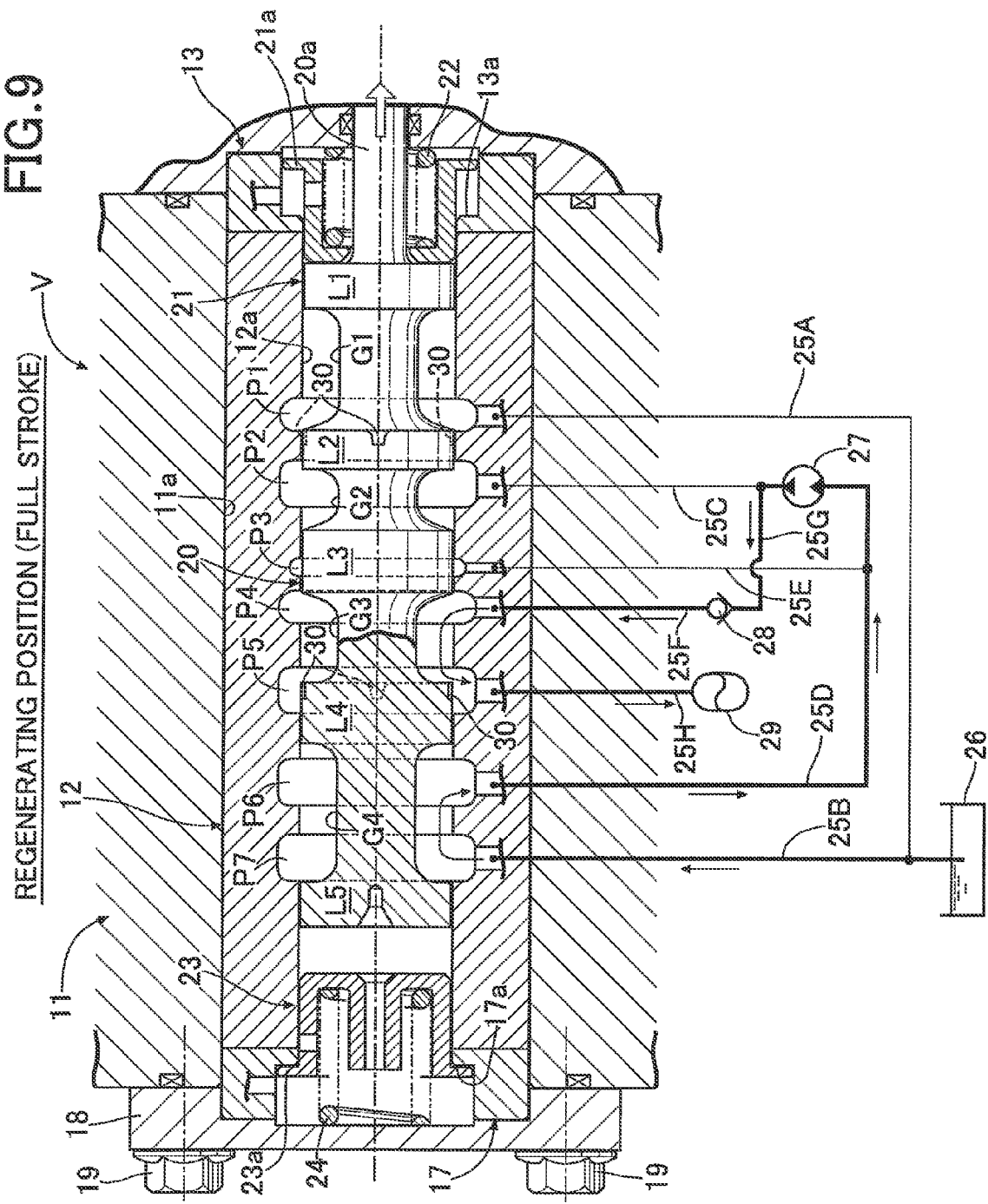
Figure 10:
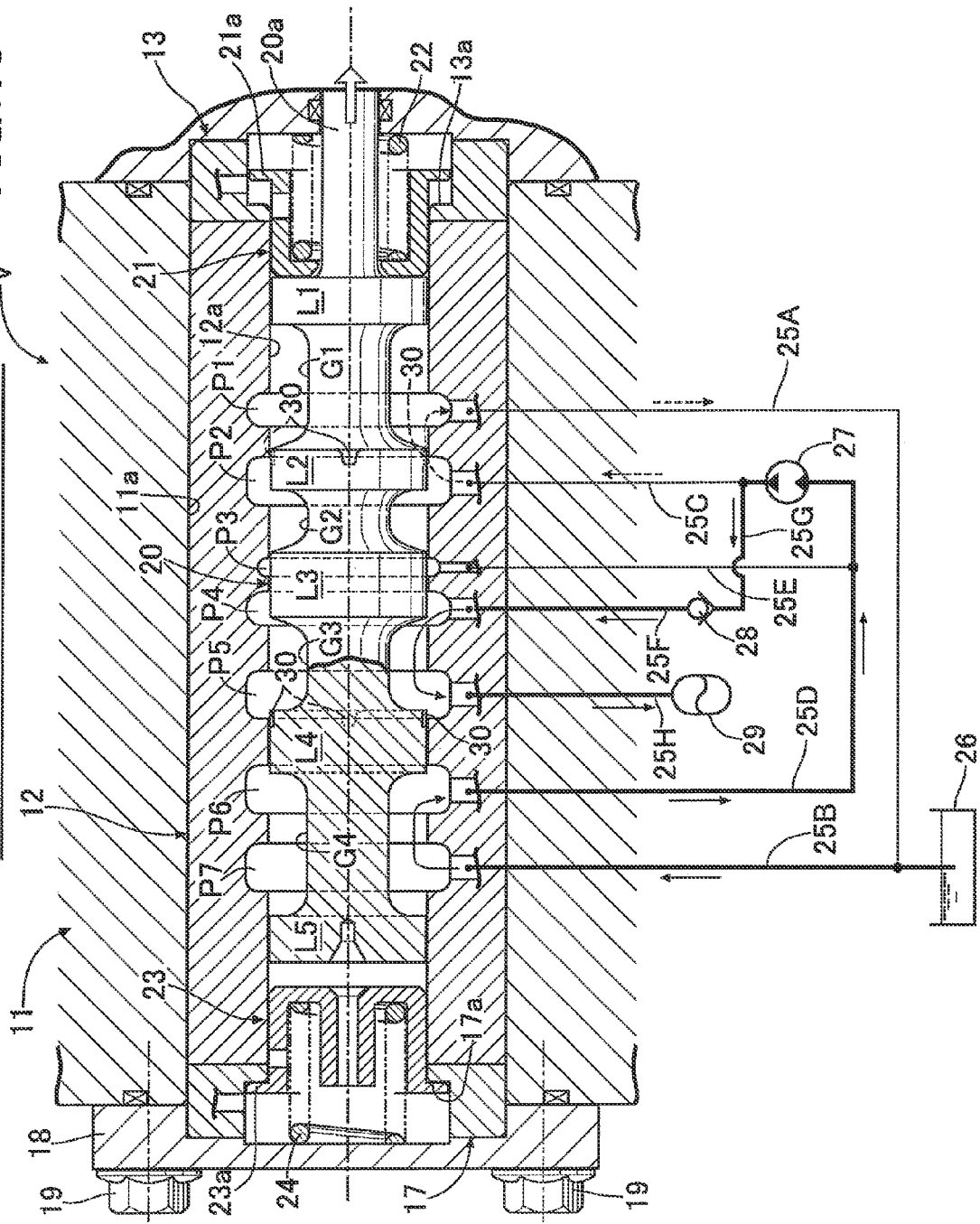

The linear solenoid 15 can effect forward or backward movement of the output rod 15a to any given position, and thus, the spool 20 can travel in a stroke to any given driving position and can travel in a stroke to any given regenerating position. FIGS. 7 and 9 illustrate the driving and regenerative side full-stroke positions, respectively, and FIGS. 8 and 10 illustrate the driving and regenerative side partial positions, respectively.

The inner peripheral surface of the spool hole 12a of the sleeve 12 is provided with the annular first to seventh ports P1 to P7 formed in order from the right end side to the left end side of the inner peripheral surface. Also, the outer peripheral surface of the spool 20 is provided with the large-diameter first to fifth lands L1 to L5 formed in order from the right end side to the left end side of the outer peripheral surface, and is provided with the small-diameter first to fourth grooves G1 to G4 formed in order in such a way as to be sandwiched between the first to fifth lands L1 to L5. The outside diameter of the first to fifth lands L1 to L5 is slightly smaller than the inside diameter of the spool hole 12a, and sealing is formed so as not to allow the passage of oil, while permitting the sliding of the spool 20 relative to the spool hole 12a, at the positions at which the outer peripheral surfaces of the first to fifth lands L1 to L5 abut against the inner peripheral surface of the spool hole 12a.

Figure 11:
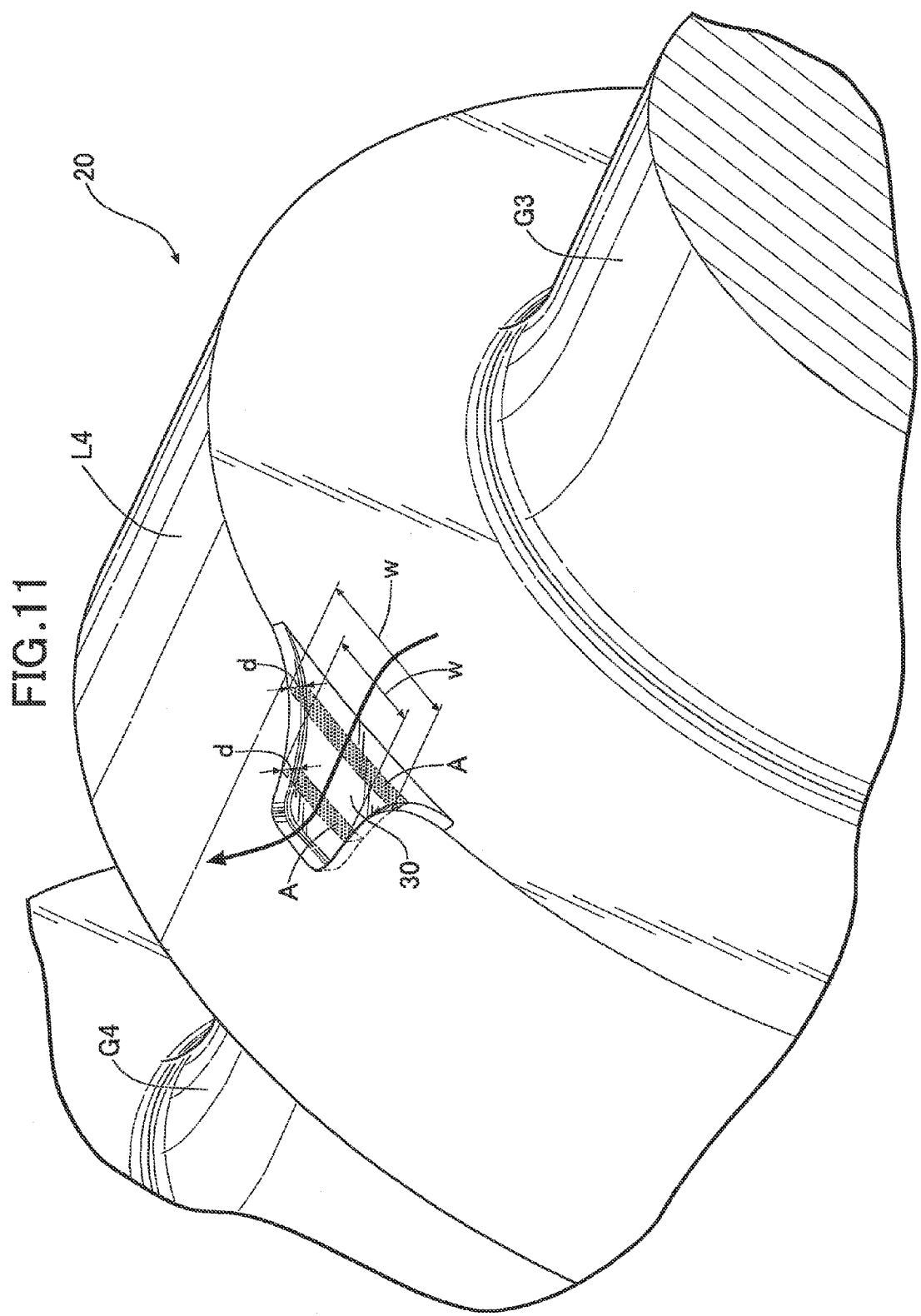

As is apparent from FIGS. 6 and 11, the portion, facing the first groove G1, of the outer peripheral surface of the second land L2 of the spool 20, and the portion, facing the third groove G3, of the outer peripheral surface of the fourth land L4 of the spool 20 are each provided with the four throttle grooves 30 formed at peripherally 90° spaced intervals. The throttle grooves 30 formed in the shape of a mountain have a certain depth d, and their circumferential width w increases nonlinearly from the top side to the foot of the mountain side. A portion of each of the throttle grooves 30 crossing the right-side edge of the second port P2 or the sixth port P6 has an opening area A, and the opening area A is given by the following equation: A=d×w.

As illustrated in FIG. 6, the first port P1 and the seventh port P7 communicate with the oil tank 26 through oil paths 25A, 25B, respectively, the second port P2 communicates with the delivery side of the pump motor 27 through the oil path 25C, the sixth port P6 communicates with the suction side of the pump motor 27 through the oil path 25D, the third port P3 communicates with the oil path 25D through the oil path 25E, the fourth port P4 communicates with the oil path 25C through the oil path 25F, the check valve 28 and the oil path 25G, and the fifth port P5 communicates with the accumulator 29 through the oil path 25H.

The pump motor 27 is connected to the crankshaft of the engine of the automobile mounting the hydraulic hybrid system, through an endless belt and the electromagnetic clutch, and, in the driving state, the pump motor 27 functions as the motor by hydraulic pressure accumulated in the accumulator 29 thereby to generate drive power for assisting the drive power from the engine, for example. In the regenerating state, the pump motor 27 functions as the pump by drive power transmitted back from the drive wheel thereby to apply pressure to oil and thus accumulate pressure in the accumulator 29. In the neutral state, the pump motor 27 idles as the pump under no-load conditions.

FIG. 7 illustrates the spool 20 as being in the leftward full-stroke driving position. The first groove G1 provides communication between the first port P1 and the second port P2, the second groove G2 provides communication between the third port P3 and the fourth port P4, the third groove G3 provides communication between the fifth port P5 and the sixth port P6, and the fourth land L4 closes off communication between the remaining seventh port P7 and the other ports.

Consequently, hydraulic pressure accumulated in the accumulator 29 flows into the oil tank 26 in turn by way of the oil path 25H, the fifth port P5, the third groove G3, the sixth port P6, the oil path 25D, the pump motor 27, the oil path 25C, the second port P2, the first groove G1, the first port P1, and the oil path 25A, and the pump motor 27 is driven as the motor by the hydraulic pressure accumulated in the accumulator 29 thereby to enable generating drive power for traveling, assisting the drive power from the engine, or cranking the engine. When hydraulic pressure in the oil path 25C on the downstream side of the pump motor 27 becomes higher than hydraulic pressure in the oil path 25D on the upstream side thereof for some reason, oil flows from the oil path 25C on the downstream side back to the oil path 25D on the upstream side in turn by way of the oil path 25G, the check valve 28, the oil path 25F, the fourth port P4, the second groove G2, the third port P3, and the oil path 25E.

Also, FIG. 9 illustrates the spool 20 as being in the rightward full-stroke regenerating position. The third groove G3 provides communication between the fourth port P4 and the fifth port P5, the fourth groove G4 provides communication between the sixth port P6 and the seventh port P7, and the second land L2 and the third land L3 close off communication between the remaining first, second and third ports P1, P2, P3 and the other ports.

Consequently, the pump motor 27 is driven as the pump by drive power transmitted back from the drive wheel, and thereby, oil in the oil tank 26 flows into the accumulator 29 in turn by way of the oil path 25B, the seventh port P7, the fourth groove G4, the sixth port P6, the oil path 25D, the pump motor 27, the oil path 25C, the oil path 25G, the check valve 28, the oil path 25F, the fourth port P4, the third groove G3, the fifth port P5, and the oil path 25H, so that the pressurized oil can be accumulated in the accumulator 29 to thus recover kinetic energy of a vehicle body at the time of deceleration.

In the neutral position illustrated in FIG. 6, the first groove G1 provides communication between the first port P1 and the second port P2, the fourth groove G4 provides communication between the sixth port P6 and the seventh port P7, and the second land L2, the third land L3 and the fourth land L4 close off communication between the remaining third, fourth and fifth ports P3, P4, P5 and the other ports.

Consequently, when the pump motor 27 functions as the pump by drive power transmitted back from the drive wheel, oil delivered by the pump motor 27 is circulated in turn by way of the oil path 25C, the second port P2, the first groove G1, the first port P1, the oil path 25A, the oil path 25B, the seventh port P7, the fourth groove G4, the sixth port P6, the oil path 25D, and the pump motor 27, and thereby, the pump motor 27 can be operated under no-load conditions.

Incidentally, in the process of going from the neutral position illustrated in FIG. 6 to the full-stroke driving position illustrated in FIG. 7, the opening area between the fifth port P5 and the sixth port P6 communicating with each other through the third groove G3 is restricted to any given opening degree by the throttle grooves 30, and thereby, partial control can be performed to adjust drive power to any given magnitude when the pump motor 27 operates as the motor.

FIG. 8 illustrates the spool 20 as being subject to the partial control in the process of going from the neutral position to the full-stroke driving position. A position at which a flow path starts opening in a mountaintop portion of each of the throttle grooves 30 by leftward movement of the spool 20 is a starting point for the partial control, the opening area A of the throttle grooves 30 increases with increasing stroke of the leftward movement of the spool 20, and a position at which the opening area of the throttle grooves 30 reaches a maximum in a mountain foot portion is an endpoint for the partial control. In the process of going from the neutral position to the full-stroke driving position, the spool 20 has a stroke of 6 mm, for example, and has a stroke of 2 mm, for example, when being subject to the partial control.

Figure 12:
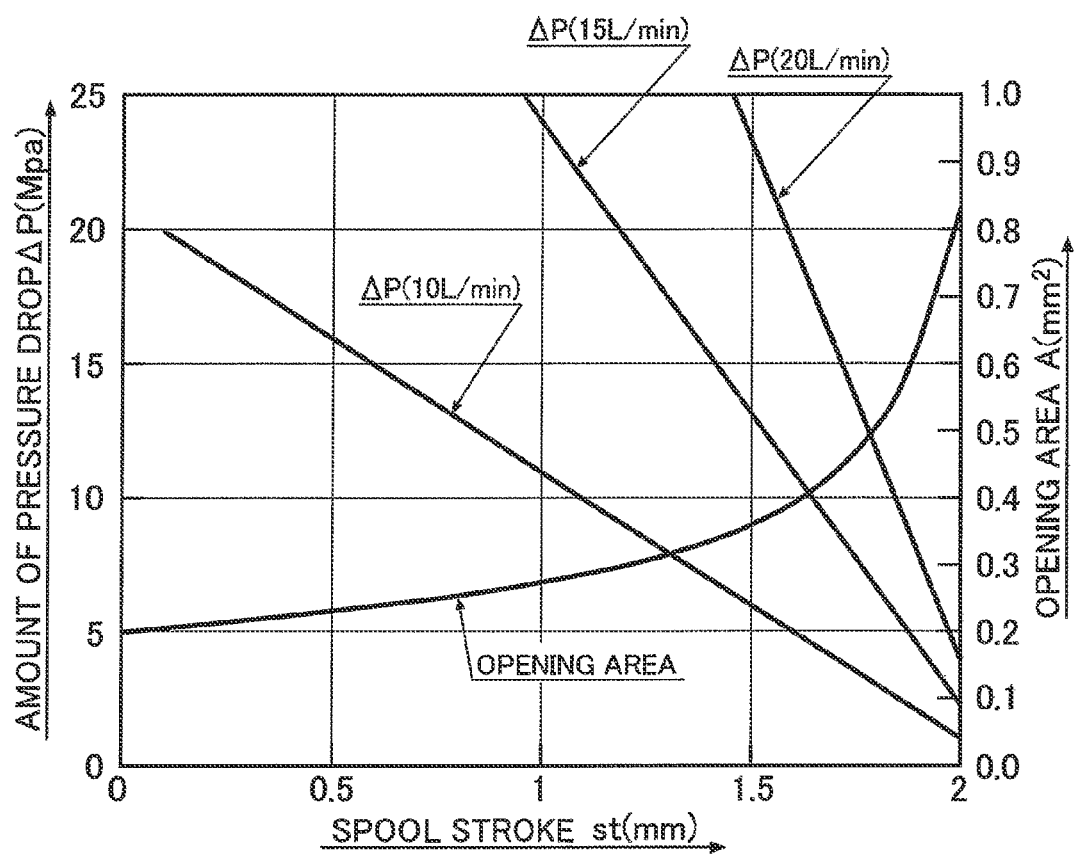

At the instant when the mountaintop portions of the four throttle grooves 30 of the fourth land L4 are opened to the sixth port P6 by leftward movement of the spool 20 from the neutral position, the fifth port P5 and the sixth port P6 communicate with each other through the throttle grooves 30. In FIG. 12, the spool 20, at this time, has a stroke of 0 mm, and the spool 20 has a stroke of 2 mm when the mountain foot portions of the throttle grooves 30 are opened to the sixth port P6 by a further leftward movement of the spool 20. The mountaintop portions of the throttle grooves 30 have the predetermined width w in a peripheral direction, and thus, a predetermined opening area (0.2 mm$^2$) is obtained from the moment the mountaintop portions of the throttle grooves 30 are opened to the sixth port P6. The opening area increases gradually with increasing stroke; however, in the last stage of the stroke, the mountain foot portions are opened to the sixth port P6 and thus the opening area increases sharply. As a result, the opening area of the throttle grooves 30 has the nonlinear characteristic of increasing slowly in the initial stages of the stroke and increasing sharply in the last stage of the stroke.

An increase in the stroke leads to an increase in the opening area of the throttle grooves 30 and hence to a decrease in the amount of pressure drop in the throttle grooves 30; however, the opening area has the above-described characteristic of changing nonlinearly, and thus, the amount of pressure drop decreases linearly with increasing stroke, and the amount of pressure drop becomes larger as the flow rate of oil passing through the throttle grooves 30 becomes higher. The amount of pressure drop in the throttle grooves 30 is in a linear correspondence with the amount of change in the flow rate of oil passing through the throttle grooves 30, and thus, the flow rate of oil can be linearly increased or decreased with increasing or decreasing stroke, so that the linear solenoid 15 can achieve an improvement in accuracy of control of the flow rate of oil.

Moreover, when the fifth port P5 and the sixth port P6 communicate with each other by leftward movement of the spool 20 from the neutral position toward the driving position (refer to FIG. 8), the throttle grooves 30 effect a gradual increase in the opening area and thus can prevent shock from being caused by a sharp increase in the opening area.

FIG. 10 illustrates the spool 20 as being subject to the partial control in the process of going from the neutral position to the full-stroke regenerating position. In the neutral position illustrated in FIG. 6, the second port P2 and the first port P1 communicate with each other through the first groove G1; however, in the process of rightward movement of the spool 20 toward the regenerating position, at the instant when the right end of the second land L2 goes across the right end of the second port P2, oil flows from the second port P2 through the throttle grooves 30 of the second land L2 into the first port P1, and thereby, the amount of pressure drop (i.e. the flow rate of oil) can be changed slowly and linearly with the stroke of the spool 20, so that the linear solenoid 15 can achieve an improvement in accuracy of control of the flow rate of oil and shock can be prevented from being caused by a sharp decrease in the opening area.

Next, third and fourth embodiments of the throttle groove 30 will be described with reference to FIGS. 13A and 13B.

Figure 13A:
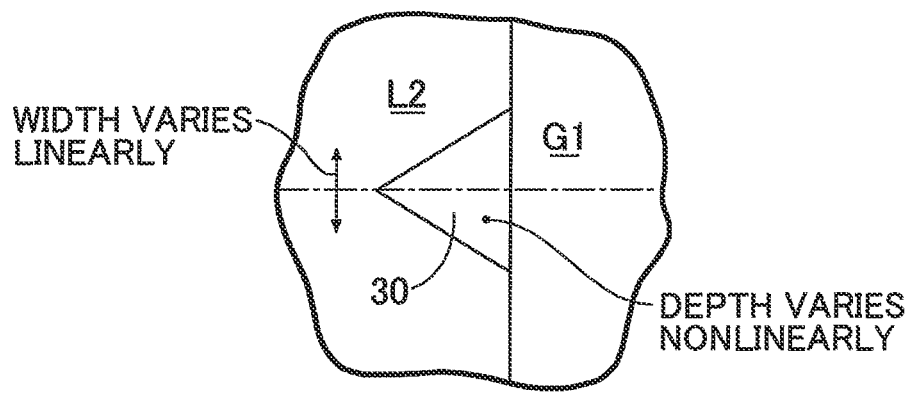
FIGS. 13A and 13B are views illustrating the shapes of throttle grooves according to third and fourth embodiments, respectively, of the present invention.

The throttle groove 30 of the third embodiment illustrated in FIG. 13A is formed in a triangular shape, and its circumferential width varies linearly in an axial direction, while its depth varies nonlinearly in the axial direction. Specifically, the depth of the throttle groove 30 is set so that the depth remains substantially constant in a predetermined range from the vertex to the base of a triangle, while the throttle groove 30 becomes sharply deep in the vicinity of the base of the triangle. Thereby, the nonlinear characteristic illustrated in FIG. 12 can be imparted to the opening area of the throttle groove 30.

Figure 13B:
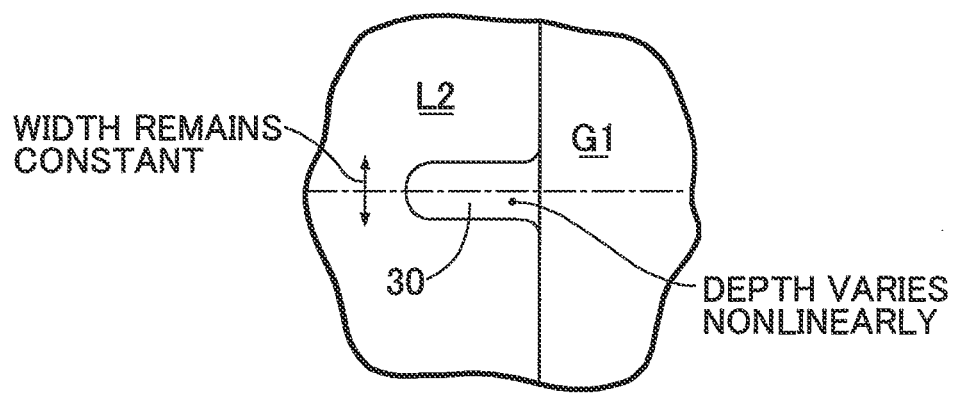

The throttle groove 30 of the fourth embodiment illustrated in FIG. 13B is formed in a rectangular shape having a long dimension in the axial direction, and its circumferential width remains constant in the axial direction, while its depth varies nonlinearly in the axial direction. Specifically, the depth of the throttle groove 30 is set so that the depth increases gradually from the left end to the right end, in the drawing, of a rectangle, and the throttle groove 30 becomes extremely sharply deep in the vicinity of the right end. Thereby, the nonlinear characteristic illustrated in FIG. 12 can be imparted to the opening area of the throttle groove 30.

Next, a fifth embodiment of the present invention will be described with reference to FIGS. 14 to 23.

Figure 14:
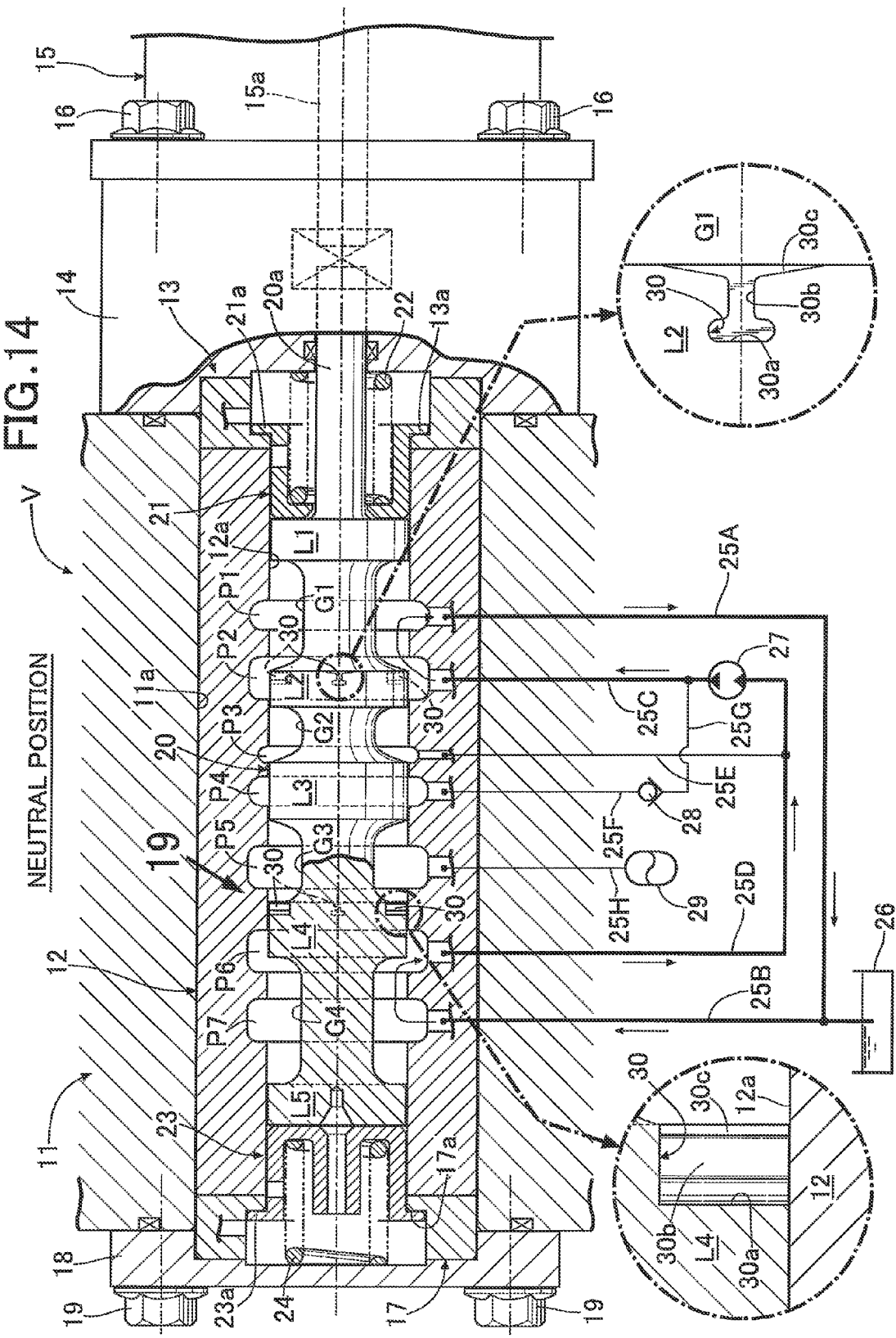

As illustrated in FIG. 14, the spool valve V for use in a hydraulic hybrid system for an automobile is provided with the cylindrical sleeve 12 fitted in the sleeve supporting hole 11a formed in the valve case 11, and the solenoid supporting member 14 covering the outer surface of the annular first end plate 13 which abuts against one end of the sleeve 12 is fastened together with the linear solenoid 15 to one side surface of the valve case 11 by the plural bolts 16, and the cover member 18 covering the outer surface of the annular second end plate 17 which abuts against the other end of the sleeve 12 is fastened to the other side surface of the valve case 11 by the plural bolts 19. The spool 20 is axially slidably fitted within the spool hole 12a formed in the sleeve 12, and the tip end of the rod portion 20a extending from one end of the spool 20 and the tip end of the output rod 15a of the linear solenoid 15 are connected together.

The hat-shaped first spring seat 21 through which the rod portion 20a of the spool 20 extends is slidably fitted in the spool hole 12a and the first end plate 13 on their inner peripheral surfaces, and the first spring seat 21 biased toward the spool 20 by the first spring 22 provided in compression between the first spring seat 21 and the solenoid supporting member 14 is stopped in a position such that the flanged portion 21a of the first spring seat 21 abuts against the stepped portion 13a of the first end plate 13. Also, the hat-shaped second spring seat 23 is slidably fitted in the spool hole 12a and the second end plate 17 on their inner peripheral surfaces, and the second spring seat 23 biased toward the spool 20 by the second spring 24 provided in compression between the second spring seat 23 and the cover member 18 is stopped in a position such that the flanged portion 23a of the second spring seat 23 abuts against the stepped portion 17a of the second end plate 17.

In this state, the spool 20 is positioned in the neutral position with its opposite portions sandwiched between the first spring seat 21 and the second spring seat 23. When the linear solenoid 15 is excited in one direction to effect forward movement of the output rod 15a, the spool 20 moves left in FIG. 14, and thereby, the second spring seat 23 pressed by the spool 20 moves left while compressing the second spring 24. This position is called the driving position (refer to FIGS. 15 and 16). Also, when the linear solenoid 15 is excited in the other direction to effect backward movement of the output rod 15a, the spool 20 moves right in FIG. 14, and thereby, the first spring seat 21 pressed by the spool 20 moves right while compressing the first spring 22. This position is called the regenerating position (refer to FIGS. 17 and 18).

Figure 15:
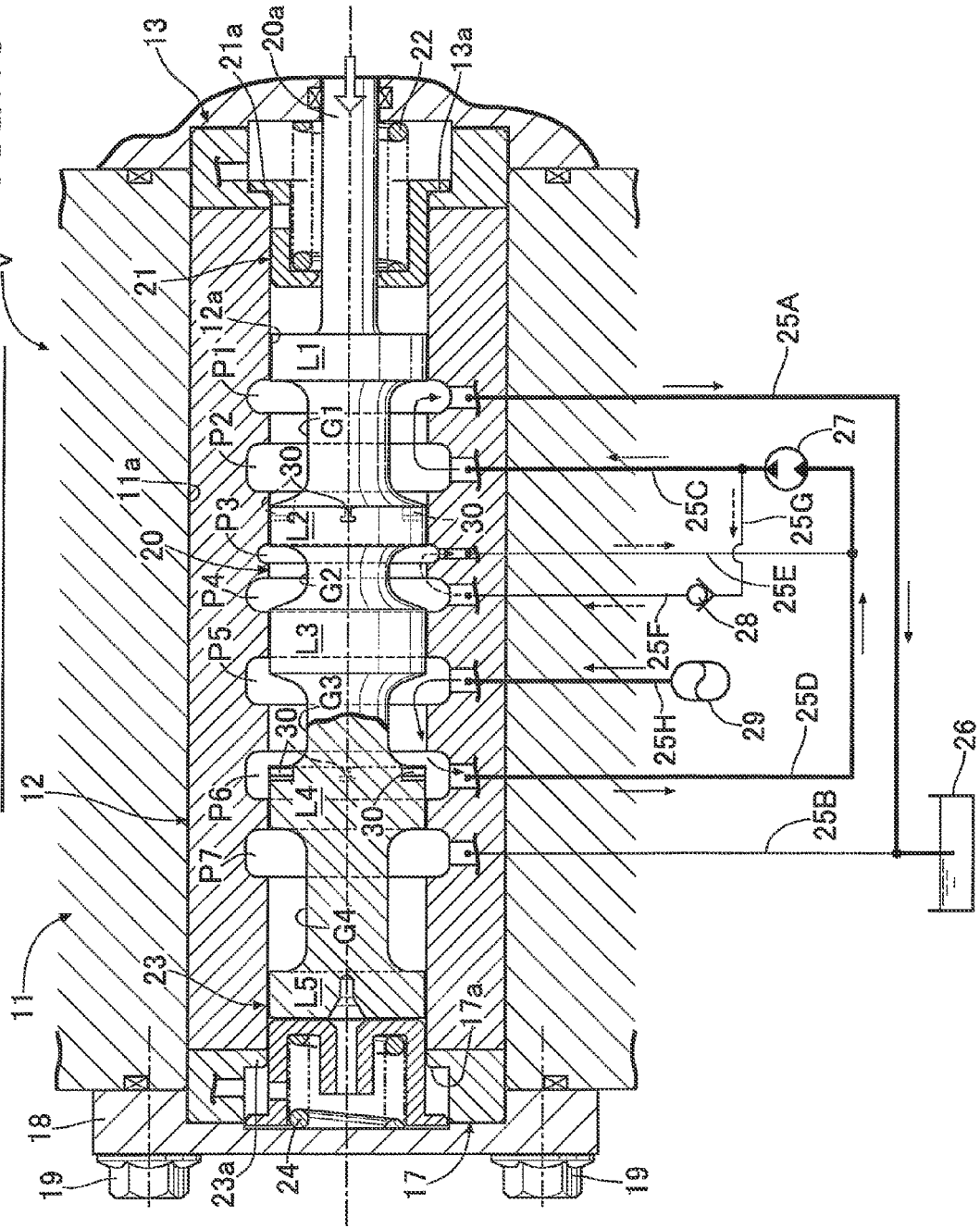
Figure 16:
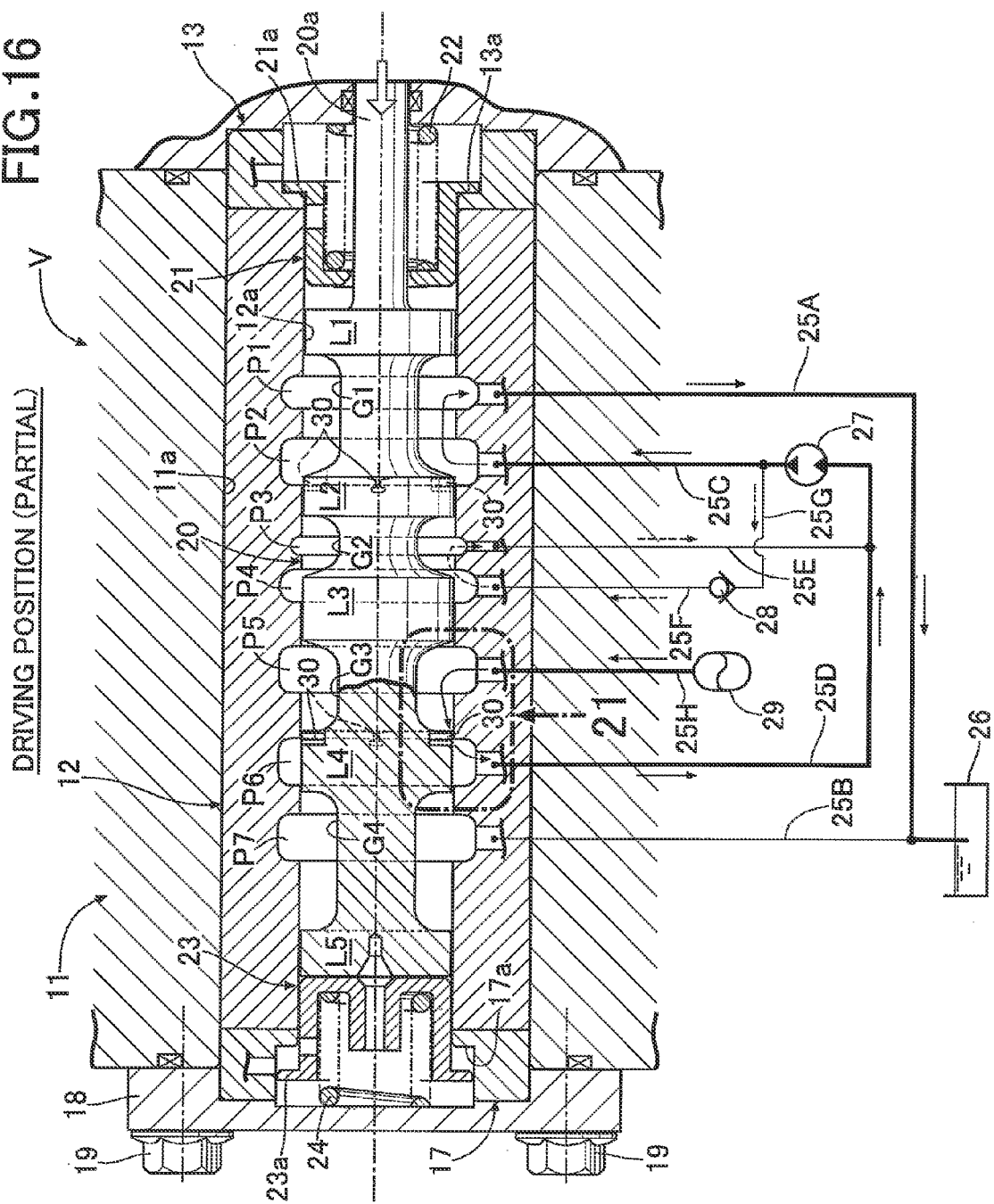
Figure 17:
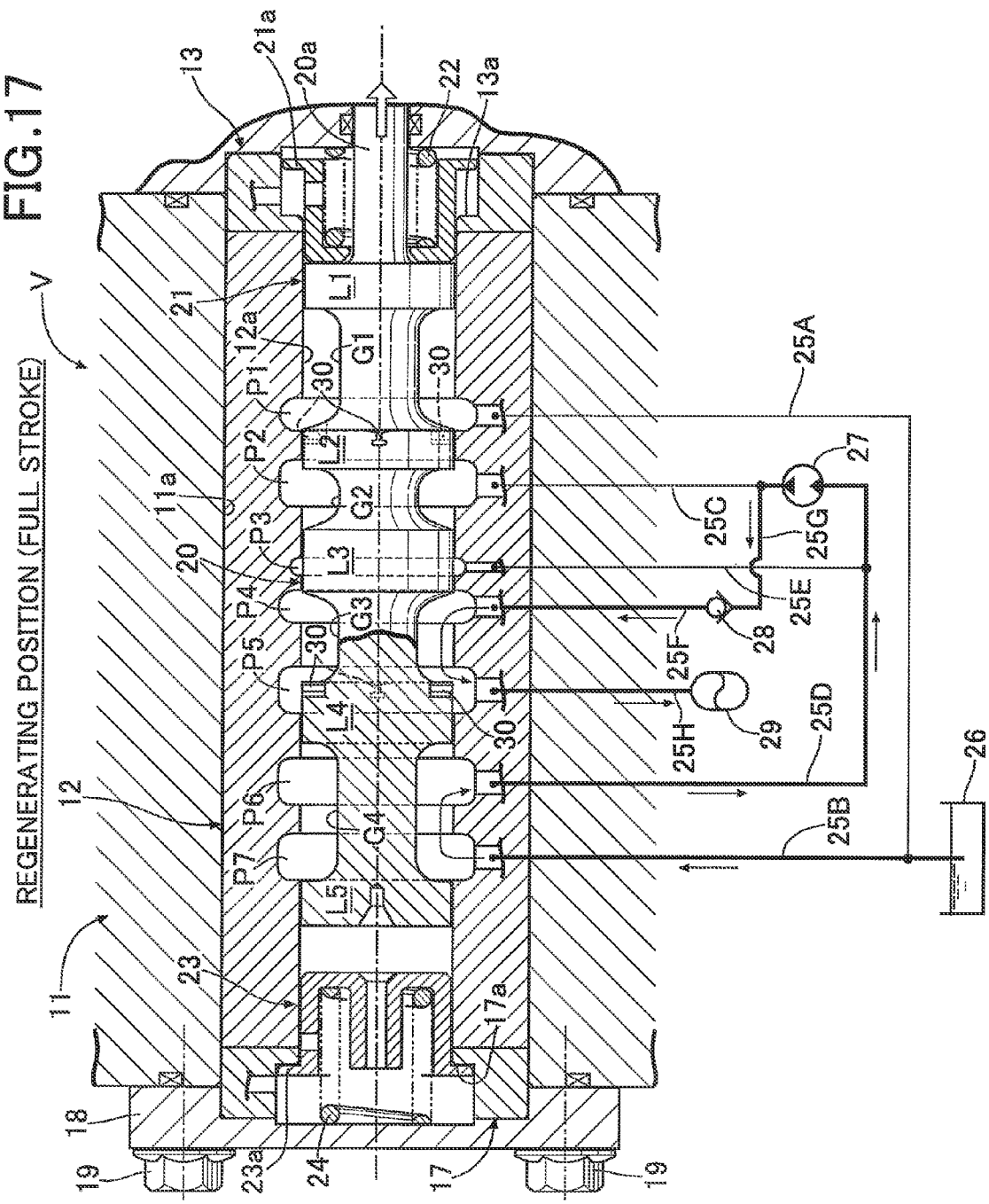
Figure 18:
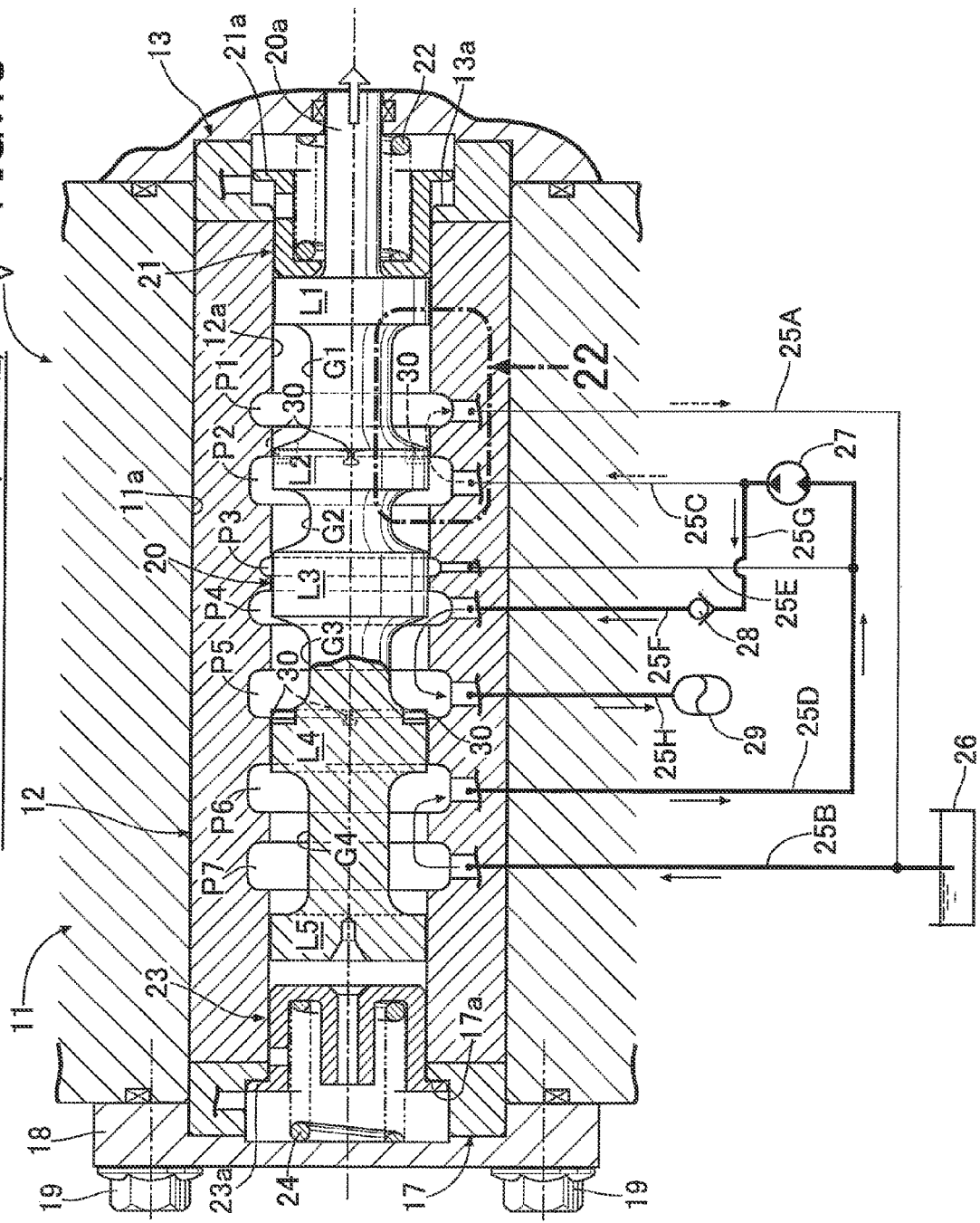
Figure 20A:
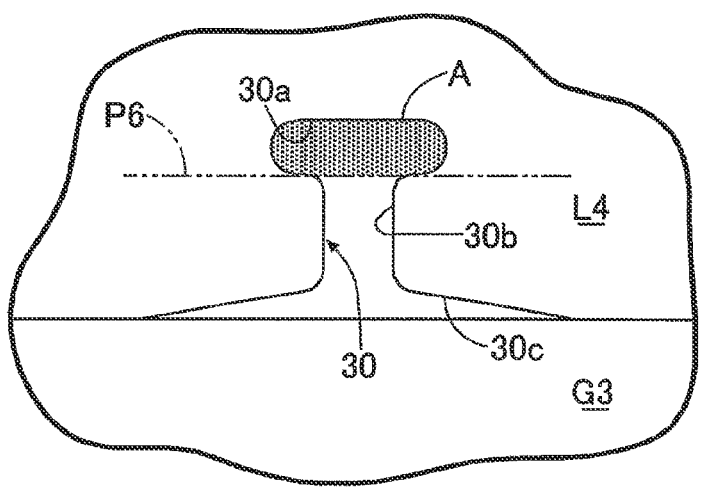
FIGS. 20A to 20C are views seen from a direction of an arrow 20 in FIG. 19.
Figure 20B:
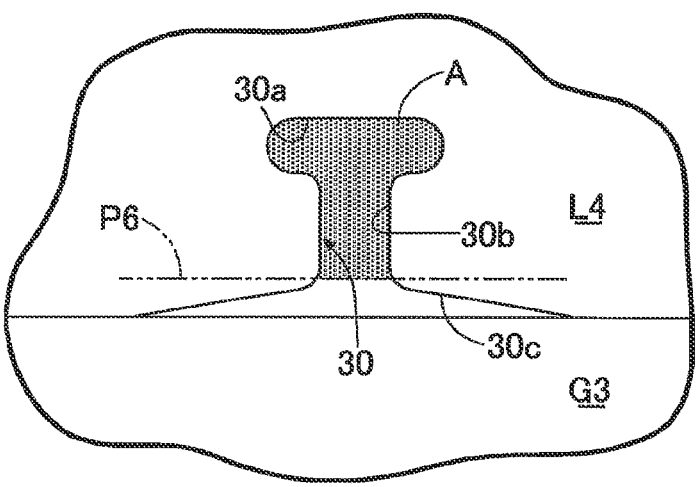
Figure 20C:
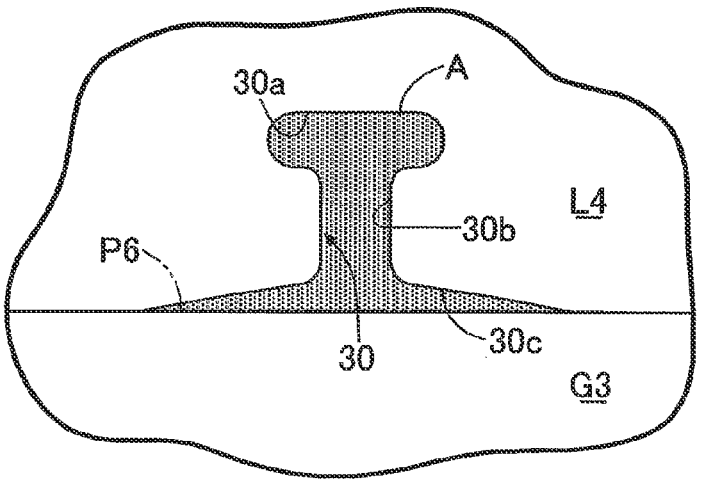

The linear solenoid 15 can effect forward or backward movement of the output rod 15a to any given position, and thus, the spool 20 can travel in a stroke to any given driving position and can travel in a stroke to any given regenerating position. FIGS. 15 and 17 illustrate the driving and regenerative side full-stroke positions, respectively, and FIGS. 16 and 18 illustrate the driving and regenerative side partial positions, respectively.

The inner peripheral surface of the spool hole 12a of the sleeve 12 is provided with the annular first to seventh ports P1 to P7 formed in order from the right end side to the left end side of the inner peripheral surface. Also, the outer peripheral surface of the spool 20 is provided with the large-diameter first to fifth lands L1 to L5 formed in order from the right end side to the left end side of the outer peripheral surface, and is provided with the small-diameter first to fourth grooves G1 to G4 formed in order in such a way as to be sandwiched between the first to fifth lands L1 to L5. The outside diameter of the first to fifth lands L1 to L5 is equal to the inside diameter of the spool hole 12a, and sealing is formed so as not to allow the passage of oil at the positions at which the outer peripheral surfaces of the first to fifth lands L1 to L5 abut the inner peripheral surface of the spool hole 12a.

As is apparent from FIGS. 14 and 19, the portion, facing the first groove G1, of the outer peripheral surface of the second land L2 of the spool 20, and the portion, facing the third groove G3, of the outer peripheral surface of the fourth land L4 of the spool 20 are each provided with the four throttle grooves 30 formed at peripherally 90° spaced intervals. The throttle grooves 30 formed in the shape of an anchor each have a tip end portion 30a, an intermediate portion 30b and a base end portion 30c, and are recessed at a certain depth d radially inwardly toward an axis of the spool 20, while maintaining a certain sectional configuration.

As illustrated in FIG. 14, the first port P1 and the seventh port P7 communicate with the oil tank 26 through the oil paths 25A, 25B, respectively, the second port P2 communicates with the delivery side of the pump motor 27 through the oil path 25C, the sixth port P6 communicates with the suction side of the pump motor 27 through the oil path 25D, the third port P3 communicates with the oil path 25D through the oil path 25E, the fourth port P4 communicates with the oil path 25C through the oil path 25F, the check valve 28 and the oil path 25G, and the fifth port P5 communicates with the accumulator 29 through the oil path 25H.

The pump motor 27 is connected to the crankshaft of the engine of the automobile mounting the hydraulic hybrid system, through the endless belt and the electromagnetic clutch, and, in the driving state, the pump motor 27 functions as the motor by hydraulic pressure accumulated in the accumulator 29 thereby to generate drive power for assisting the drive power from the engine, for example. In the regenerating state, the pump motor 27 functions as the pump by drive power transmitted back from the drive wheel thereby to apply pressure to oil and thus accumulate pressure in the accumulator 29. In the neutral state, the pump motor 27 idles as the pump under no-load conditions.

FIG. 15 illustrates the spool 20 as being in the leftward full-stroke driving position. The first groove G1 provides communication between the first port P1 and the second port P2, the second groove G2 provides communication between the third port P3 and the fourth port P4, the third groove G3 provides communication between the fifth port P5 and the sixth port P6, and the fourth land L4 closes off communication between the remaining seventh port P7 and the other ports.

Consequently, hydraulic pressure accumulated in the accumulator 29 flows into the oil tank 26 in turn by way of the oil path 25H, the fifth port P5, the third groove G3, the sixth port P6, the oil path 25D, the pump motor 27, the oil path 25C, the second port P2, the first groove G1, the first port P1, and the oil path 25A, and the pump motor 27 is driven as the motor by the hydraulic pressure accumulated in the accumulator 29 thereby to enable generating drive power for traveling, assisting the drive power from the engine, or cranking the engine. When hydraulic pressure in the oil path 25C on the downstream side of the pump motor 27 becomes higher than hydraulic pressure in the oil path 25D on the upstream side thereof for some reason, oil flows from the oil path 25C on the downstream side back to the oil path 25D on the upstream side in turn by way of the oil path 25G, the check valve 28, the oil path 25F, the fourth port P4, the second groove G2, the third port P3, and the oil path 25E.

Also, FIG. 17 illustrates the spool 20 as being in the rightward full-stroke regenerating position. The third groove G3 provides communication between the fourth port P4 and the fifth port P5, the fourth groove G4 provides communication between the sixth port P6 and the seventh port P7, and the second land L2 and the third land L3 close off communication between the remaining first, second and third ports P1, P2, P3 and the other ports.

Consequently, the pump motor 27 is driven as the pump by drive power transmitted back from the drive wheel, and thereby, oil in the oil tank 26 flows into the accumulator 29 in turn by way of the oil path 25B, the seventh port P7, the fourth groove G4, the sixth port P6, the oil path 25D, the pump motor 27, the oil path 25C, the oil path 25G, the check valve 28, the oil path 25F, the fourth port P4, the third groove G3, the fifth port P5, and the oil path 25H, so that the pressurized oil can be accumulated in the accumulator 29 to thus recover kinetic energy of the vehicle body at the time of deceleration.

In the neutral position illustrated in FIG. 14, the first groove G1 provides communication between the first port P1 and the second port P2, the fourth groove G4 provides communication between the sixth port P6 and the seventh port P7, and the second land L2, the third land L3 and the fourth land L4 close off communication between the remaining third, fourth and fifth ports P3, P4, P5 and the other ports.

Consequently, when the pump motor 27 functions as the pump by drive power transmitted back from the drive wheel, oil delivered by the pump motor 27 is circulated in turn by way of the oil path 25C, the second port P2, the first groove G1, the first port P1, the oil path 25A, the oil path 25B, the seventh port P7, the fourth groove G4, the sixth port P6, the oil path 25D, and the pump motor 27, and thereby, the pump motor 27 can be operated under no-load conditions.

Incidentally, in the process of going from the neutral position illustrated in FIG. 14 to the full-stroke driving position illustrated in FIG. 15, the opening area between the fifth port P5 and the sixth port P6 communicating with each other through the third groove G3 is restricted to any given opening degree by the throttle grooves 30, and thereby, the partial control can be performed to adjust drive power to any given magnitude when the pump motor 27 operates as the motor.

Figure 21A:
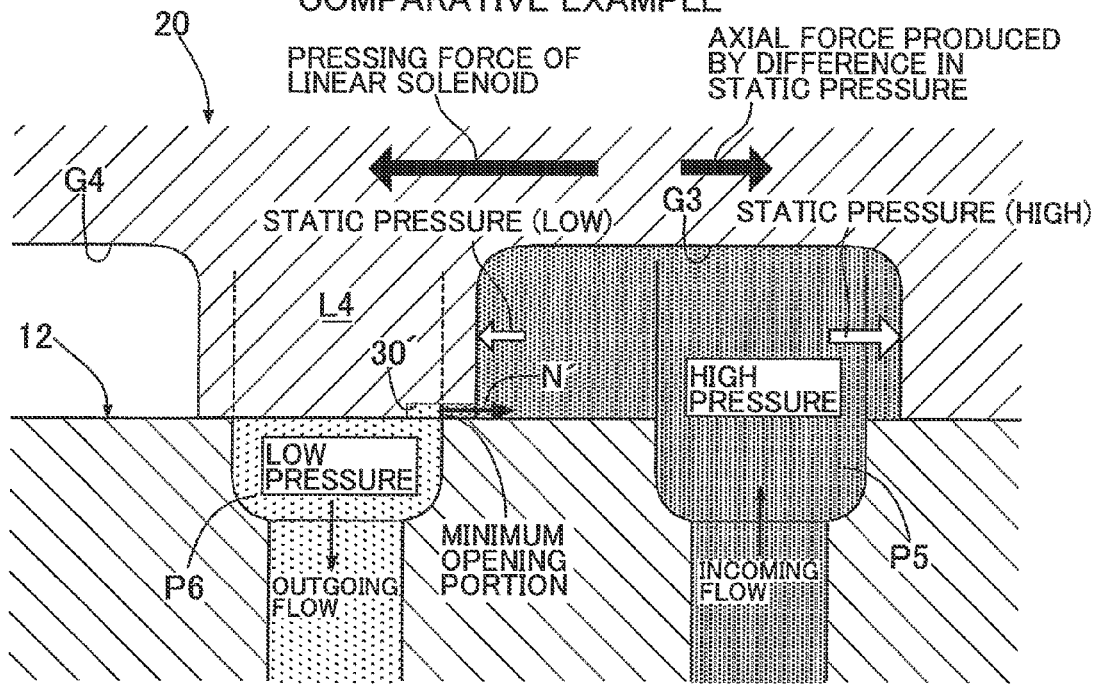
FIGS. 21A and 21B are enlarged views of a part indicated by an arrow 21 in FIG. 16.
Figure 21B:
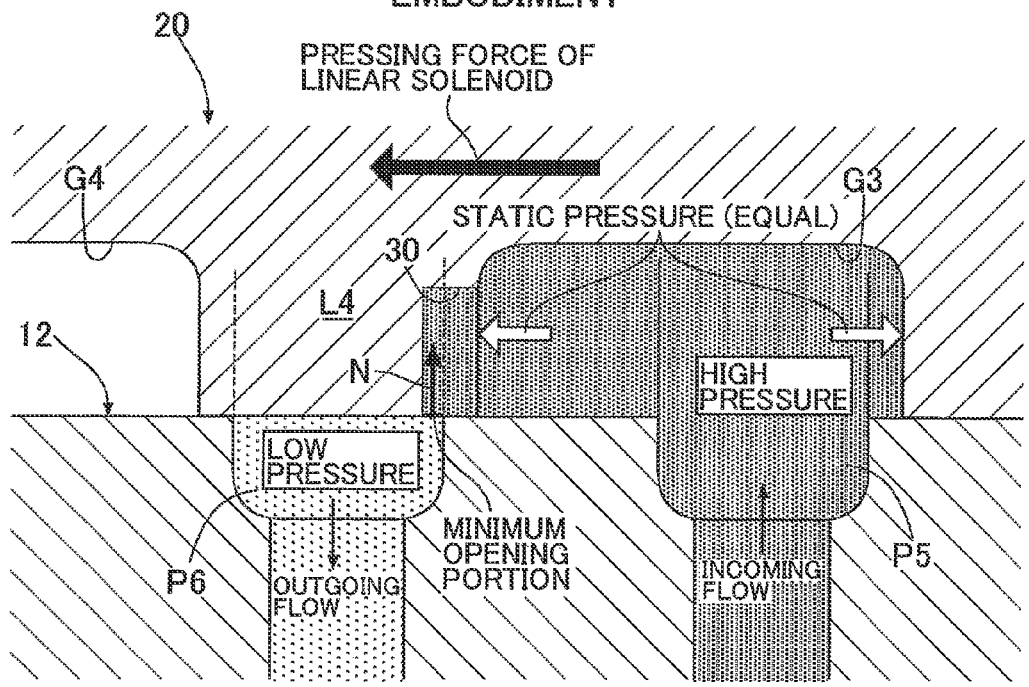

FIGS. 16 and 21B illustrate the spool 20 as being subject to the partial control in the process of going from the neutral position to the full-stroke driving position. A position at which the tip end portion 30a of each of the throttle grooves 30 starts opening by leftward movement of the spool 20 is a starting point for the partial control, the opening area A (refer to FIG. 19) of the throttle groove 30 increases with increasing stroke of the leftward movement of the spool 20, and a position at which the opening area A reaches a maximum upon completion of opening of the base end portion 30c is an endpoint for the partial control. In the process of going from the neutral position to the full-stroke driving position, the spool 20 has a stroke of 6 mm, for example, and has a stroke of 2 mm, for example, when being subject to the partial control.

During a duration between the start of opening of the tip end portion 30a of each of the throttle grooves 30 and the completion of opening of the base end portion 30c thereof (refer to FIGS. 20A to 20C), a flow-path sectional area A' of the throttle grooves 30 in the axial direction of the spool 20 is equal to w×d, which is the product of the width w of the throttle grooves 30 in the peripheral direction and the depth d thereof (refer to FIG. 19), and the depth d of the throttle grooves 30 is sufficiently great and hence the flow-path sectional area A' in the axial direction is larger than the opening area A of the throttle grooves 30 in the radial direction regardless of the stroke position of the spool 20. Assuming that, when oil flows through the throttle grooves 30, the most throttled portion of the flow path is a minimum opening portion, therefore, the minimum opening portion is represented as hatched areas in FIG. 19 and FIGS. 20A to 20C (which are portions of each of the throttle grooves 30 opened to the sixth port P6), and a minimum opening area corresponds to the above-described opening area A.

In other words, according to the shape of the throttle grooves 30 of the present embodiment, during the duration between the start of opening of the tip end portions 30a of the throttle grooves 30 and the completion of opening of the base end portions 30c thereof, portions of the throttle grooves 30 opened to the outer peripheral surface of the fourth land L4 are the minimum opening portions of the throttle grooves 30. Therefore, the minimum opening portion lies within the outer peripheral surface of the fourth land L4, and a direction of a normal N to an opening surface of the minimum opening portion is orthogonal to the axis of the spool 20.

Incidentally, the throttle grooves 30 are formed in the shape of the anchor formed of the tip end portion 30a, the intermediate portion 30b and the base end portion 30c for the following reason. A relationship between the stroke of the spool 20 and the minimum opening area of the throttle grooves 30 is set to nonlinearity so that the minimum opening area increases slowly in the initial stages of the stroke and increases sharply in the last stage of the stroke, and thereby, the flow rate of oil is linearly increased or decreased with increasing or decreasing stroke in order that the linear solenoid 15 achieves an improvement in accuracy of control of the flow rate of oil. Also, according to the shape of the throttle grooves 30, when the fifth port P5 and the sixth port P6 communicate with each other by leftward movement of the spool 20 from the neutral position toward the driving position (refer to FIG. 16), the throttle grooves 30 effect a gradual increase in the opening area and thus can prevent shock from being caused by a sharp increase in the opening area.

FIG. 23 illustrates the shape of throttle grooves 30' of Comparative Example. The throttle grooves 30' formed in the shape of a mountain have a relatively shallow, certain depth d, and their circumferential width w increases nonlinearly from the top side to the foot of the mountain side. The depth d of the throttle grooves 30' is shallow, and thus, from the moment immediately after the start of opening of the throttle grooves 30', a direction of a normal N' to the minimum opening portion indicated by hatching coincides with the axial direction of the spool 20 and is orthogonal to the direction of the normal N to the minimum opening portion of the present embodiment (the radial direction of the spool 20).

Next, description will be given with reference to FIGS. 21A and 21B and FIGS. 22A and 22B with regard to differences in operation between the throttle grooves 30 of the fifth embodiment and the throttle grooves 30' of Comparative Example.

FIGS. 21A and 21B are schematic illustrations for explaining the operation of the throttle grooves 30 (the throttle grooves 30') formed in the fourth land L4 and configured to throttle a flow of oil flowing out of the third groove G3 and into the sixth port P6, when the spool 20 is in the driving side partial position.

In Comparative Example illustrated in FIG. 21A, the normal N' to the minimum opening portion of the throttle grooves 30' is oriented in the axial direction of the spool 20, and high pressure develops on the upstream side of the minimum opening portion (on the third groove G3 side) and low pressure develops on the downstream side thereof (on the sixth port P6 side). Considering static pressure acting on left and right sidewalls of the third groove G3, the high pressure acts on the right sidewall throughout its entire area, while the low pressure acts on the left sidewall in the throttle groove 30' portion and the high pressure acts on the left sidewall in the remaining portion. As a result, a load of the static pressure pressing the right sidewall rightward is higher than a load of the static pressure pressing the left sidewall leftward, and the spool 20 is biased rightward by a difference in static pressure.

At this time, the linear solenoid 15 produces a leftward pressing force in order to bring the third groove G3 into communication with the sixth port P6; however, a rightward axial force produced by the difference in static pressure acts against the pressing force of the linear solenoid 15, thus leading to a problem of rendering unstable the control of the stroke position of the spool 20 by the linear solenoid 15.

Meanwhile, in the embodiment illustrated in FIG. 21B, the normal N to the minimum opening portion of the throttle grooves 30 is oriented in the radial direction of the spool 20, and a load produced by a differential pressure between the high-pressure upstream side of the minimum opening portion (the third groove G3 side) and the low-pressure downstream side thereof (the sixth port P6 side) acts in the radial direction of the spool 20, and thus, the axial force acting against the pressing force of the linear solenoid 15 does not develop, so that the linear solenoid 15 can achieve an improvement in accuracy of control of the stroke position of the spool 20.

Figure 22A:
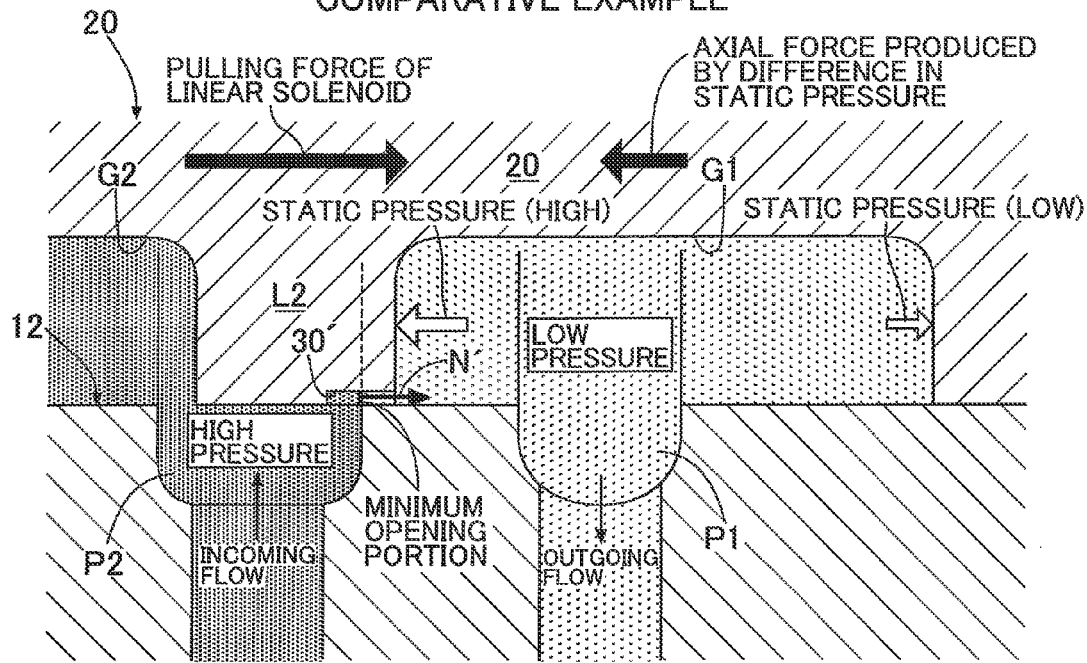
FIGS. 22A and 22B are enlarged views of a part indicated by an arrow 22 in FIG. 18.
Figure 22B:
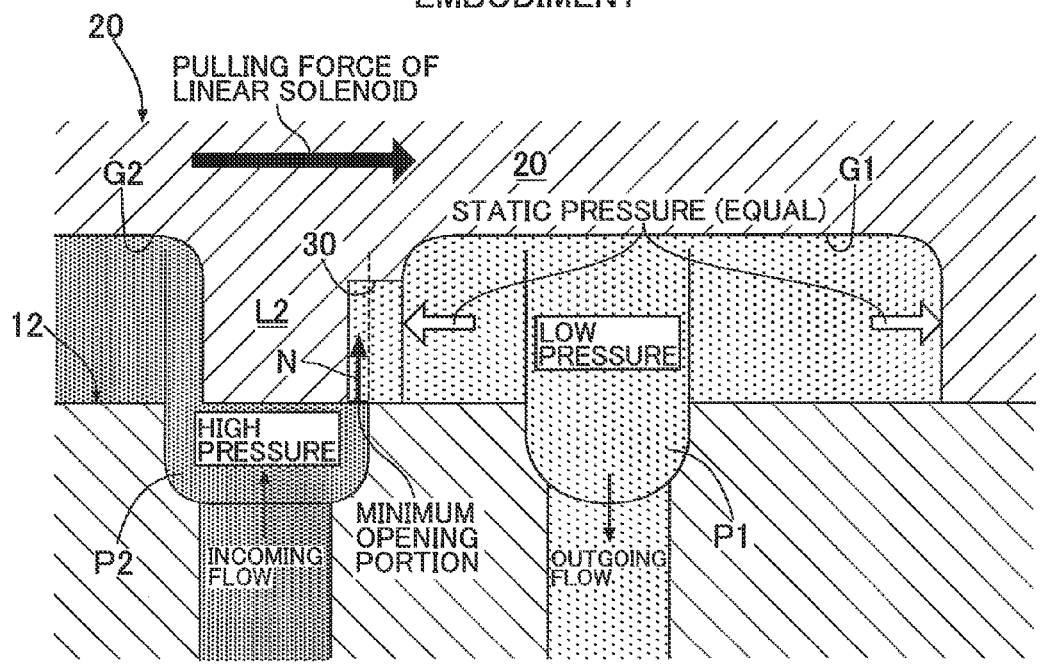

FIGS. 22A and 22B are schematic illustrations for explaining the operation of the throttle grooves 30 (30') formed in the second land L2 and configured to throttle a flow of oil flowing out of the second port P2 and into the first groove G1, when the spool 20 is in the regenerative side partial position.

In Comparative Example illustrated in FIG. 22A, the normal N' to the minimum opening portion of the throttle grooves 30' is oriented in the axial direction of the spool 20, and high pressure develops on the upstream side of the minimum opening portion (on the second port P2 side) and low pressure develops on the downstream side thereof (on the first groove G1 side). Considering static pressure acting on left and right sidewalls of the first groove G1, the low pressure acts on the right sidewall throughout its entire area, while the high pressure acts on the left sidewall in the throttle groove 30' portion and the low pressure acts on the left sidewall in the remaining portion. As a result, a load of the static pressure pressing the left sidewall leftward is higher than a load of the static pressure pressing the right sidewall rightward, and the spool 20 is biased leftward by a difference in static pressure.

At this time, the linear solenoid 15 produces a rightward pulling force in order to cut off the first groove G1 from the second port P2; however, a leftward axial force produced by the difference in static pressure acts against the pulling force of the linear solenoid 15, thus leading to a problem of rendering unstable the control of the stroke position of the spool 20 by the linear solenoid 15.

Meanwhile, in the embodiment illustrated in FIG. 22B, the normal N to the minimum opening portion of the throttle grooves 30 is oriented in the radial direction of the spool 20, and a load produced by a differential pressure between the high-pressure upstream side of the minimum opening portion (the second port P2 side) and the low-pressure downstream side thereof (the first groove G1 side) acts in the radial direction of the spool 20, and thus, the axial force acting against the pulling force of the linear solenoid 15 can be significantly reduced, so that the linear solenoid 15 can achieve an improvement in accuracy of control of the stroke position of the spool 20.

According to the present embodiment, as described above, the direction of the minimum opening portion of the throttle grooves 30 formed in the second land L2 and the fourth land L4 of the spool 20 is always orthogonal to the axis of the spool 20, and thus, even when a differential pressure develops across the upstream side and the downstream side of the minimum opening portion of the throttle grooves 30, a load produced by the differential pressure merely acts in the radial direction of the spool 20 and does not act in the axial direction. As a result, an axial force produced by the differential pressure is prevented from being added to or subtracted from an actuation force of the linear solenoid 15, so that the linear solenoid 15 can achieve an improvement in accuracy of control of the stroke position of the spool 20.

Figure 24:
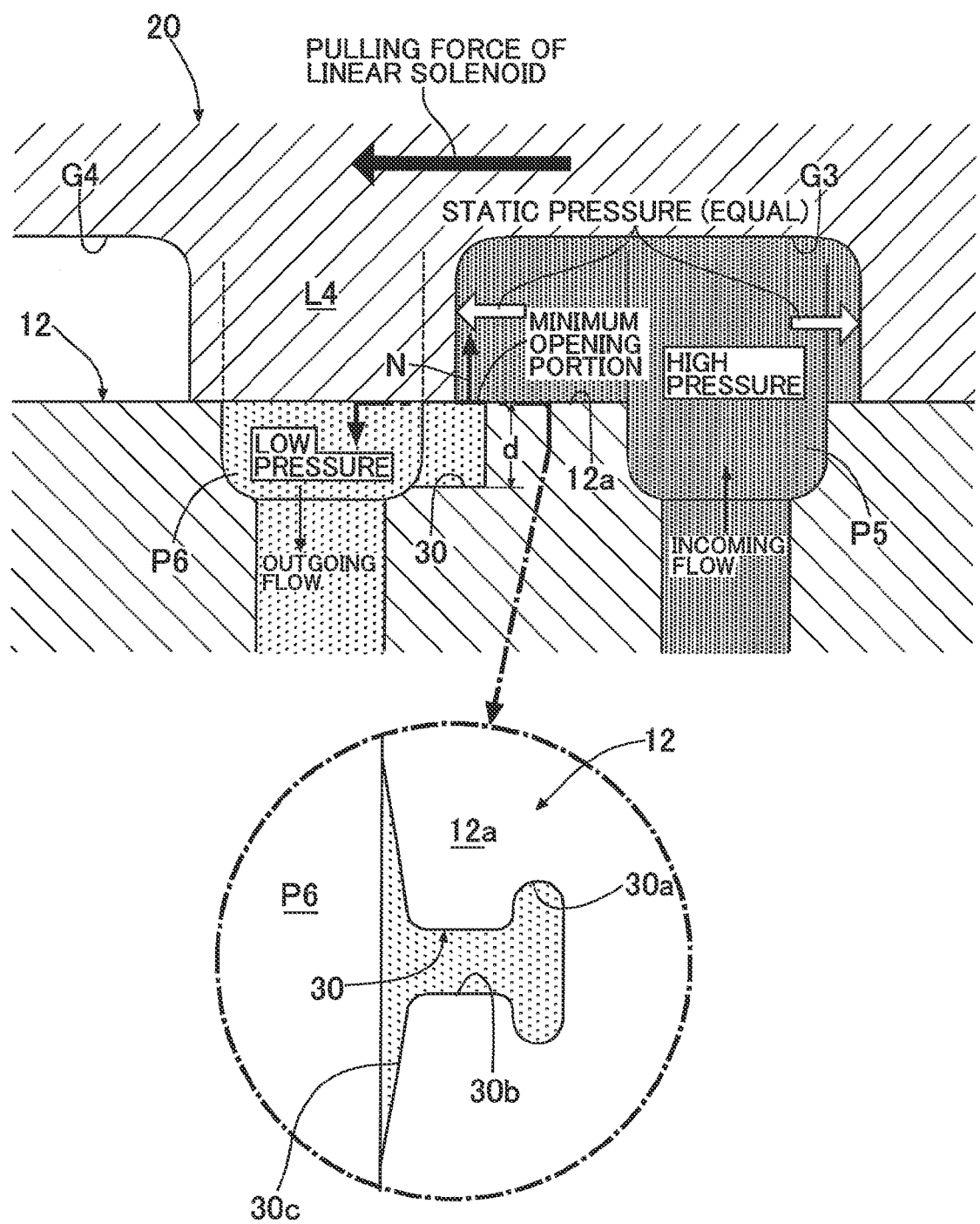
FIG. 24 is a view corresponding to FIG. 21B, illustrating a sixth embodiment of the present invention.

Next, a sixth embodiment of the present invention will be described with reference to FIG. 24.

In the above-described fifth embodiment, the throttle grooves 30 are formed in the outer peripheral surfaces of the second land L2 and the fourth land L4 of the spool 20; however, in the sixth embodiment, the throttle grooves 30 are formed in the inner peripheral surface of the spool hole 12a facing the second land L2 and the fourth land L4 of the spool 20. As in the case of the fifth embodiment, each of the throttle grooves 30 is of the shape of the anchor having the tip end portion 30a, the intermediate portion 30b and the base end portion 30c, and is recessed at a certain depth d radially outwardly in a direction away from the axis of the spool 20, while maintaining a certain sectional shape.

According to the present embodiment, also, the direction of the normal N to the opening surface of the minimum opening portion of each of the throttle grooves 30 is orthogonal to the axis of the spool 20, and a load produced by a differential pressure between the high-pressure upstream side of the minimum opening portion (the third groove G3 side) and the low-pressure downstream side thereof (the sixth port P6 side) acts in the radial direction of the spool 20, and thus, the axial force acting against the pressing force of the linear solenoid 15 does not develop, so that the linear solenoid 15 can achieve an improvement in accuracy of control of the stroke position of the spool 20.

Machining for forming the throttle grooves 30 in the inner peripheral surface of the spool hole 12a can be accomplished by electric discharge machining.

Although embodiments of the present invention have been described above, it should be understood that the various design changes could be made thereto without departing from the gist of the present invention.

For example, in the embodiments, the power train PT includes both the engine E and the transmission; however, the power train of the present invention may include at least any one of the engine and the transmission.

Also, in the embodiments, the hydraulic hybrid system 41 is housed within the oil tank 26; however, the hydraulic hybrid system may be disposed externally of the oil tank 26. In this case, the crankshaft 43 of the engine E and the rotary shaft 50 of the pump motor 27 can be connected together through a pulley and an endless belt disposed externally of the cylinder block 42.

Also, it is to be understood that the shape and number of the throttle grooves 30 formed in the lands of the spool 20 are not limited to the embodiments.

Also, any linear actuator such as a linear motor or a ball screw may be used in place of the linear solenoid 15.

What is claimed is:

1. A hydraulic hybrid vehicle comprising:
   a power train including an engine and a transmission;
   a pump motor; and
   an accumulator,
   wherein the pump motor is configured to be driven as a motor by hydraulic pressure accumulated in the accumulator to effect travel of the vehicle, to assist the engine, or to start the engine, and the pump motor is configured to be driven as a pump by drive power from the engine or by drive power transmitted back from a drive wheel to accumulate pressure in the accumulator,
   wherein the pump motor is also configured to serve as a pump to supply hydraulic oil or lubricating oil to the power train, and
   wherein a crankshaft of the engine and a rotary shaft of the pump motor are connected together through power transmission means, and a delivery port of the pump motor and a main gallery of the engine are connected together through an oil path.

2. The hydraulic hybrid vehicle according to claim 1, comprising:
   a spool valve configured to perform switching between oil paths to connect the power train, the pump motor and the accumulator,
   the spool valve including
      a spool having a land and a groove formed in an outer peripheral surface thereof,
      a valve housing having a plurality of ports formed in an inner peripheral surface of a spool hole in which the spool is slidably fitted, and
      a linear actuator configured to drive the spool,
   wherein the linear actuator changes a stroke position of the spool and thereby the land and the groove perform control to provide and close off communication between the plurality of ports, and an outer peripheral surface of the land is provided with a throttle groove and an opening area of the throttle groove is set so that a relationship between the stroke position of the spool and an amount of pressure drop varies substantially linearly.

3. The hydraulic hybrid vehicle according to claim 2, wherein
   the throttle groove has a shape such that a depth in a radial direction of the land remains substantially constant and a width in a peripheral direction of the land varies non-linearly along an axial direction.

4. The hydraulic hybrid vehicle according to claim 1, comprising:
   a spool valve configured to perform switching between oil paths to connect the power train, the pump motor and the accumulator, the spool valve including
- a spool having a land and a groove formed in an outer peripheral surface thereof,
- a valve housing having a plurality of ports formed in an inner peripheral surface of a spool hole in which the spool is slidably fitted, and
- a linear actuator configured to drive the spool, wherein the linear actuator changes a stroke position of the spool and thereby the land and the groove perform control to provide and close off communication between the plurality of ports, and an outer peripheral surface of the land is provided with a throttle groove and a direction of a surface which forms a minimum opening portion of a flow path in the throttle groove is substantially orthogonal to an axial direction of the spool.

5. The hydraulic hybrid vehicle according to claim 4, wherein
the surface which forms the minimum opening portion lies within the outer peripheral surface of the land.

6. The hydraulic hybrid vehicle according to claim 1, comprising:
a spool valve configured to perform switching between oil paths to connect the power train, the pump motor and the accumulator, the spool valve including
- a spool having a land and a groove formed in an outer peripheral surface thereof,
- a valve housing having a plurality of ports formed in an inner peripheral surface of a spool hole in which the spool is slidably fitted, and
- a linear actuator configured to drive the spool, wherein the linear actuator changes a stroke position of the spool and thereby the land and the groove perform control to provide and close off communication between the plurality of ports, and the inner peripheral surface of the spool hole is provided with a throttle groove and a direction of a surface which forms a minimum opening portion of a flow path in the throttle groove is substantially orthogonal to an axial direction of the spool.

7. The hydraulic hybrid vehicle according to claim 6, wherein
the surface which forms the minimum opening portion lies within the inner peripheral surface of the spool hole.

* * * * *